(12) United States Patent
Watano et al.

(10) Patent No.: US 11,787,330 B2
(45) Date of Patent: Oct. 17, 2023

(54) VEHICLE LAMP SYSTEM

(71) Applicant: KOITO MANUFACTURING CO., LTD., Tokyo (JP)

(72) Inventors: Yuichi Watano, Shizuoka (JP); Takao Muramatsu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/292,962

(22) PCT Filed: Nov. 1, 2019

(86) PCT No.: PCT/JP2019/043121
§ 371 (c)(1),
(2) Date: May 11, 2021

(87) PCT Pub. No.: WO2020/100638
PCT Pub. Date: May 22, 2020

(65) Prior Publication Data
US 2021/0402915 A1 Dec. 30, 2021

(30) Foreign Application Priority Data

Nov. 12, 2018 (JP) ................ 2018-212376
Nov. 12, 2018 (JP) ................ 2018-212377
Nov. 12, 2018 (JP) ................ 2018-212378

(51) Int. Cl.
*B60Q 1/14* (2006.01)
*H05B 47/11* (2020.01)
(Continued)

(52) U.S. Cl.
CPC .......... *B60Q 1/143* (2013.01); *B60Q 1/0023* (2013.01); *B60Q 1/14* (2013.01); *G06V 20/56* (2022.01);
(Continued)

(58) Field of Classification Search
CPC .................. B60Q 1/143; B60Q 1/0023
See application file for complete search history.

(56) References Cited

U.S. PATENT DOCUMENTS 6,254,259 B1 * 7/2001 Kobayashi ............. B60Q 1/085
340/459
2006/0044818 A1 * 3/2006 Amagasa ................ B60Q 1/28
362/514

(Continued)

FOREIGN PATENT DOCUMENTS

DE 102012103293 A1 10/2013
EP 2529975 A2 12/2012
(Continued)

OTHER PUBLICATIONS

International Search Report (PCT/ISA/210) dated Jan. 7, 2020 issued by the International Searching Authority in International Application No. PCT/JP2019/043121.
(Continued)

*Primary Examiner* — William N Harris
(74) *Attorney, Agent, or Firm* — Sughrue Mion, PLLC

(57) ABSTRACT

A vehicle lamp system includes an illuminance variable lamp, a lamp-mounted camera, and a lamp control unit. After acquiring position information of a low accuracy region from a vehicle control unit, the lamp control unit acquires illuminance of the low accuracy region by referring to information acquired by the lamp-mounted camera, controls the illuminance variable lamp so as to increase the illuminance of the low accuracy region if the illuminance of the low accuracy region is less than a threshold, and/or controls the illuminance variable lamp so as to decrease the illuminance of the low accuracy region if the illuminance of the low accuracy region is equal to or greater than the threshold.

10 Claims, 16 Drawing Sheets

(51) Int. Cl.
*G06V 20/56* (2022.01)
*G06V 20/58* (2022.01)
*B60Q 1/00* (2006.01)

(52) U.S. Cl.
CPC ............. *G06V 20/58* (2022.01); *H05B 47/11* (2020.01); *B60Q 2300/314* (2013.01); *B60Q 2300/338* (2013.01); *B60Q 2300/45* (2013.01)

(56) References Cited

U.S. PATENT DOCUMENTS

| | | | |
|---|---|---|---|
| 2007/0242470 A1* | 10/2007 | Michiyama | B60Q 1/20 362/464 |
| 2008/0062706 A1* | 3/2008 | Feldmeier | F21S 41/14 340/468 |
| 2008/0175012 A1* | 7/2008 | Shimaoka | B60Q 9/008 362/464 |
| 2010/0052550 A1 | 3/2010 | Kobayashi | |
| 2011/0068910 A1* | 3/2011 | Iwai | F21S 41/663 340/435 |
| 2014/0049973 A1* | 2/2014 | Adachi | B60Q 11/00 362/465 |
| 2016/0240085 A1* | 8/2016 | Otsuka | H04N 13/239 |
| 2017/0050556 A1* | 2/2017 | Nakashima | B60Q 1/085 |
| 2018/0339645 A1* | 11/2018 | Ekkizogloy | B60Q 1/08 |
| 2019/0031088 A1* | 1/2019 | Hiramatsu | B60Q 1/14 |
| 2019/0275923 A1* | 9/2019 | Fushimi | G01S 13/865 |
| 2019/0320106 A1 | 10/2019 | Tatara et al. | |
| 2019/0359121 A1 | 11/2019 | Shimada | |
| 2020/0010079 A1* | 1/2020 | Ito | B60Q 1/143 |
| 2021/0031675 A1 | 2/2021 | Shibata et al. | |
| 2021/0370820 A1 | 12/2021 | Shibata et al. | |

FOREIGN PATENT DOCUMENTS

| | | |
|---|---|---|
| JP | 2010185769 A | 8/2010 |
| WO | 2018/096619 A1 | 5/2018 |
| WO | 2018110389 A1 | 6/2018 |
| WO | 2018/135356 A1 | 7/2018 |

OTHER PUBLICATIONS

Written Opinion (PCT/ISA/237) dated Jan. 7, 2020 issued by the International Searching Authority in International Application No. PCT/JP2019/043121.

Communication dated Dec. 6, 2021 by the European Patent Office in European Patent Application No. 19884167.8.

Communication dated Apr. 5, 2022 by the European Patent Application No. 19884167.8.

* cited by examiner

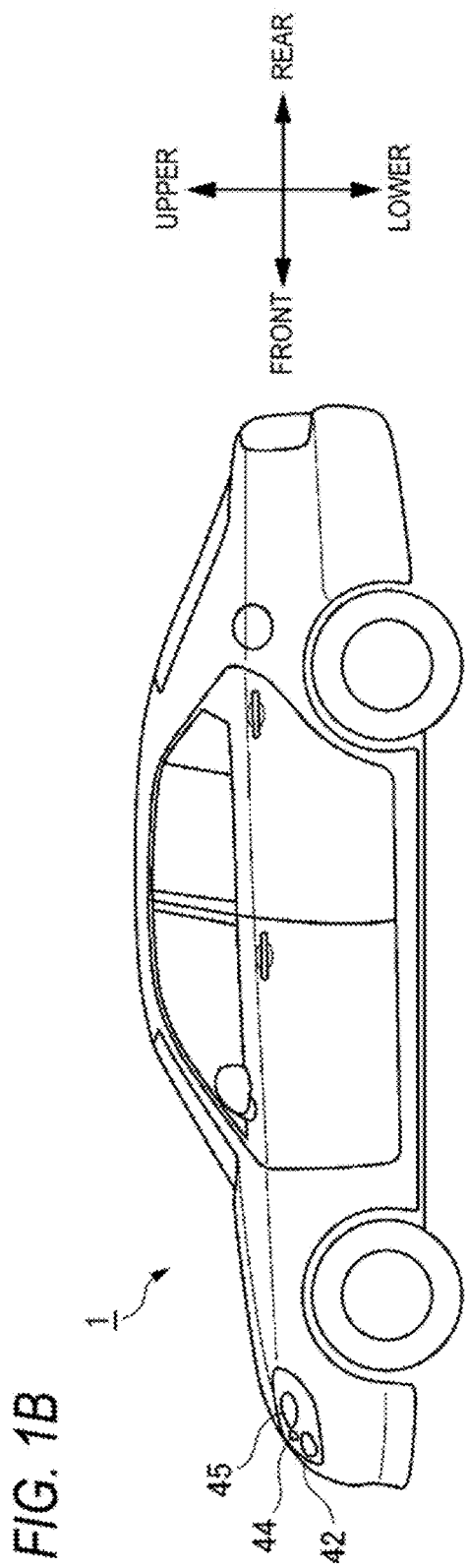

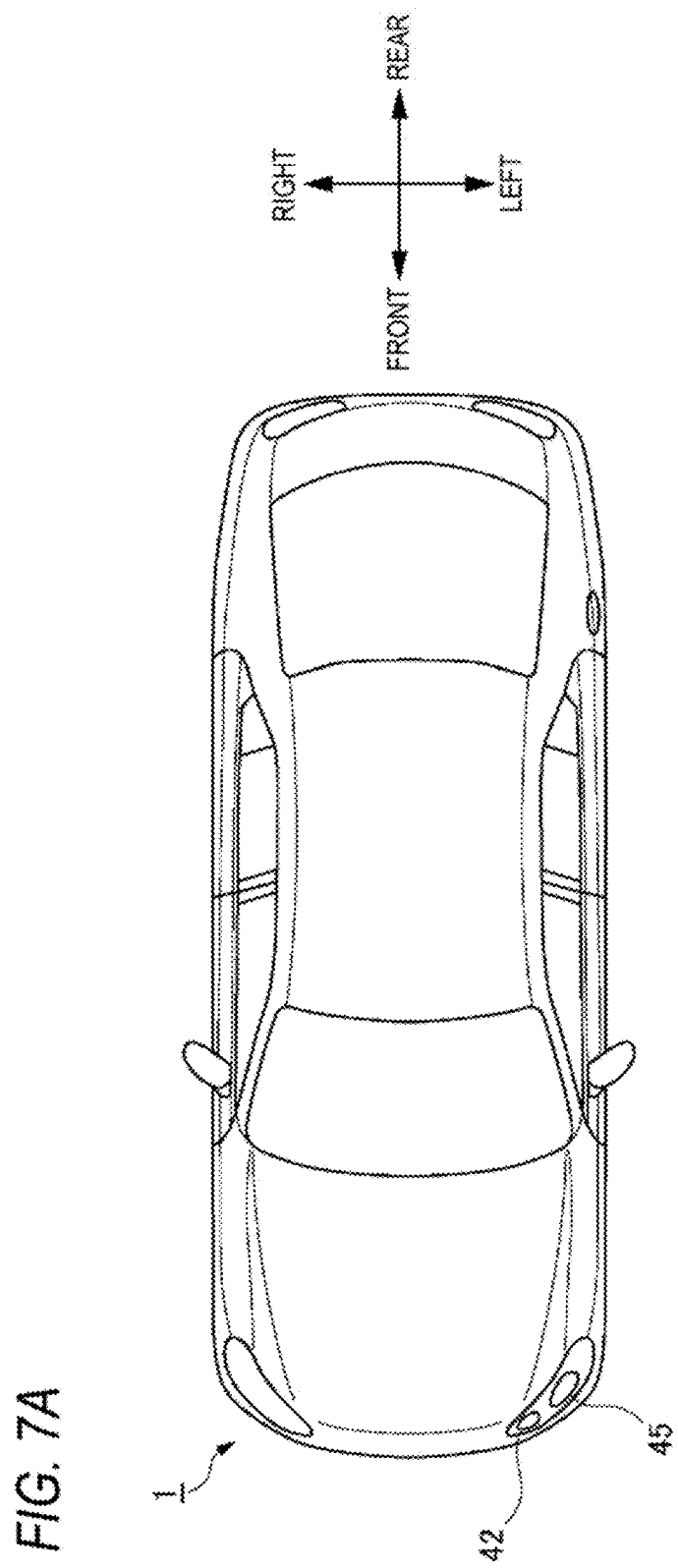

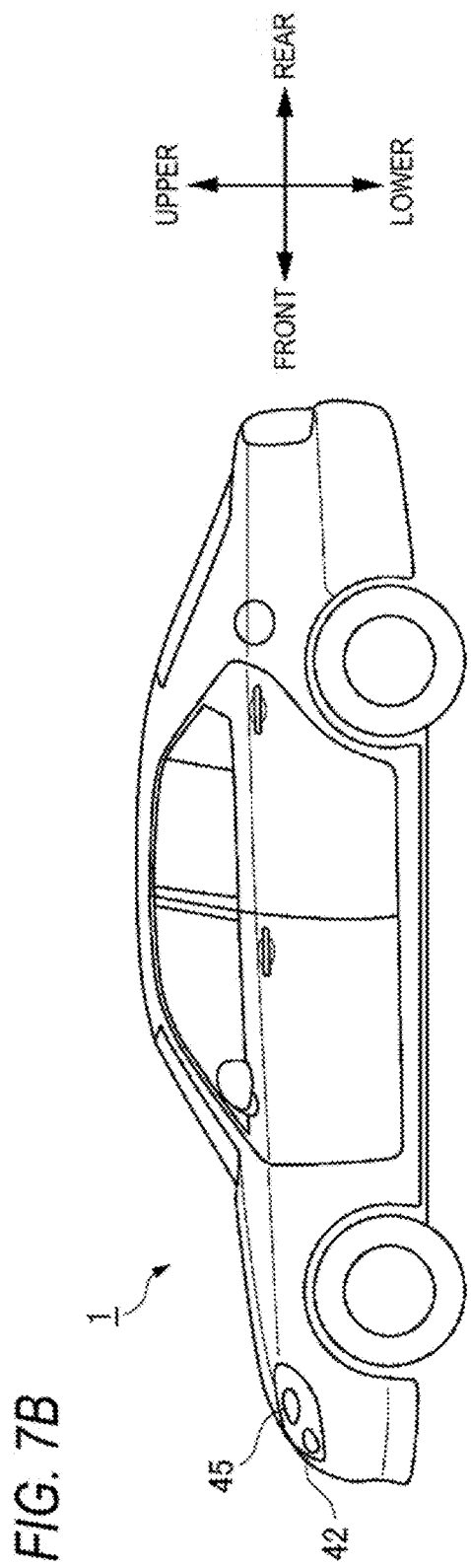

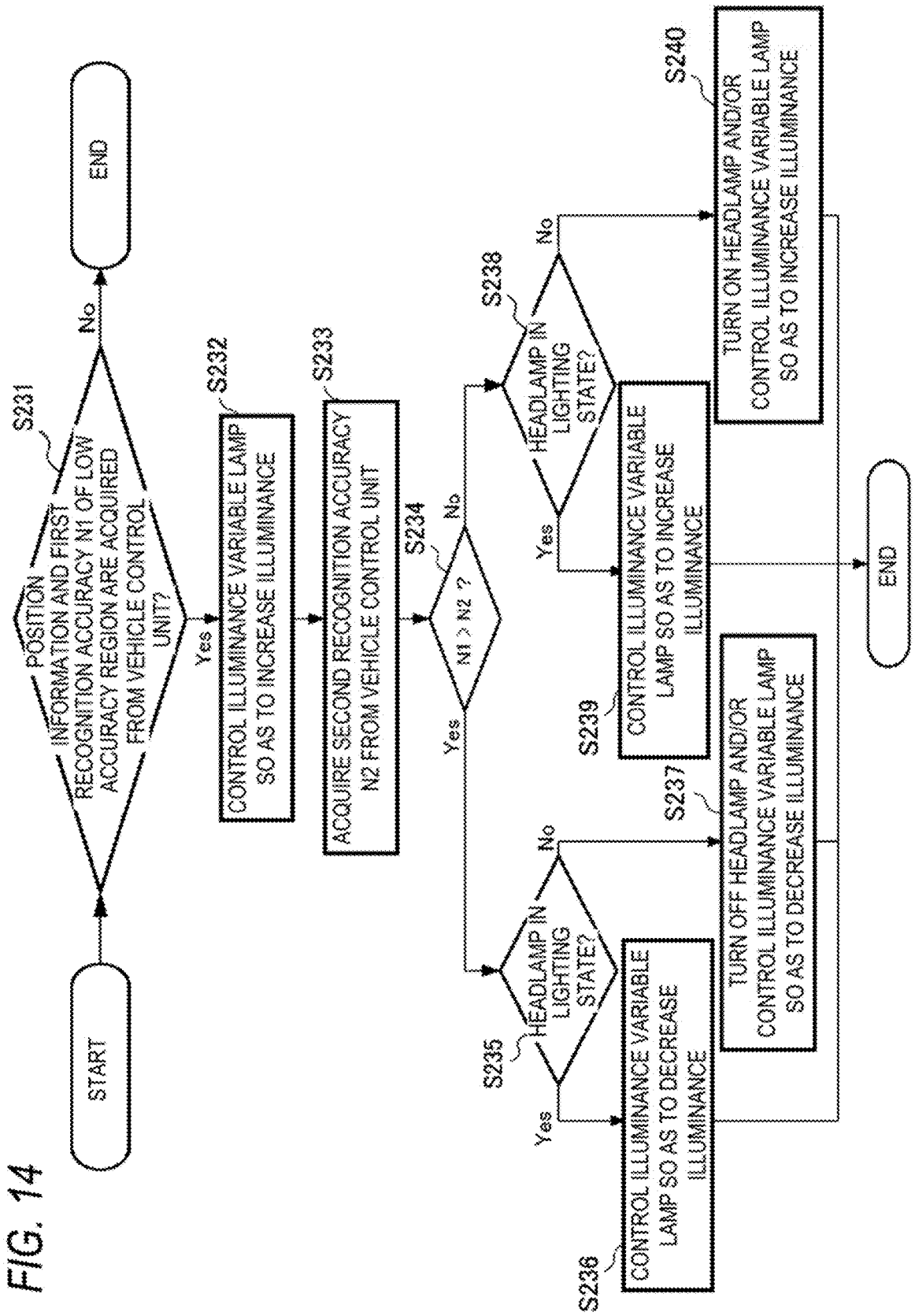

VEHICLE LAMP SYSTEM

TECHNICAL FIELD

The present invention relates to a vehicle lamp system.

BACKGROUND ART

In order to realize a driving assistance technology of a vehicle, it is necessary to mount a sensor for detecting information outside the vehicle on a vehicle body. An example of such a sensor is a vehicle camera (see, for example, Patent Literature 1). The vehicle camera becomes increasingly important as the driving assistance technology of the vehicle becomes more sophisticated.

CITATION LIST

Patent Literature

Patent Literature 1: JP2010-185769A

SUMMARY OF INVENTION

Technical Problem

Incidentally, a vehicle control unit recognizes an object based on an image captured by the vehicle camera. For example, an accuracy of recognition that an object is a pedestrian by the vehicle control unit changes depending on a distance between the object and an own vehicle and a degree of sharpness of the image. The accuracy of recognition is called recognition accuracy.

The recognition accuracy may be affected by a vehicle lamp which emits light to surroundings of the own vehicle. For example, if reflective light which is extremely strong from a certain region is incident on the vehicle camera as compared with reflective light from another region, whiteout occurs in a part of the image corresponding to the region, and the recognition accuracy is decreased. Alternatively, if reflective light which is extremely dark from a certain region is incident on the vehicle camera as compared with reflective light from another region, blackout occurs in apart of the image corresponding to the region. In this way, the recognition accuracy is low in the region where whiteout or blackout occurs.

Therefore, the present invention provides a vehicle lamp system capable of improving recognition accuracy of a vehicle camera.

Solution to Problem

According to one aspect of the present invention, there is provided a vehicle lamp system including:

an illuminance variable lamp capable of emitting light toward an entire angle of view of a vehicle camera mounted on a vehicle and capable of performing adjustment such that illuminance of any region is different from illuminance of another region;

a lamp-mounted camera including, in an angle of view, a range including the angle of view of the vehicle camera; and a lamp control unit configured to control the illuminance variable lamp, in which the lamp control unit is configured to after acquiring, from a vehicle control unit configured to control the vehicle, position information of a low accuracy region where a recognition accuracy of the angle of view of the vehicle camera is equal to or less than a predetermined value, acquire illuminance of the low accuracy region with reference to information acquired by the lamp-mounted camera, and control the illuminance variable lamp so as to increase the illuminance of the low accuracy region if the illuminance of the low accuracy region is less than a threshold, and/or control the illuminance variable lamp so as to decrease the illuminance of the low accuracy region if the illuminance of the low accuracy region is equal to or greater than the threshold.

Further, according to one aspect of the present invention, there is provided a vehicle lamp system including:

an illuminance variable lamp capable of emitting light toward an entire angle of view of a vehicle camera mounted on a vehicle and capable of performing adjustment such that illuminance of any region is different from illuminance of another region;

a lamp-mounted camera including, in an angle of view, a range including the angle of view of the vehicle camera;

an illuminance fixing lamp capable of emitting light with a specific illuminance toward a region including the angle of view of the vehicle camera; and a lamp control unit configured to control the illuminance variable lamp and the illuminance fixing lamp, in which the lamp control unit is configured to after acquiring, from a vehicle control unit configured to control the vehicle, position information and illuminance of a low accuracy region where a recognition accuracy of the angle of view of the vehicle camera is equal to or less than a predetermined value, determine whether the illuminance of the low accuracy region is less than a threshold, turn on the illuminance fixing lamp and/or control the illuminance variable lamp so as to increase the illuminance of the low accuracy region if the illuminance of the low accuracy region is less than the threshold, and/or turn off the illuminance fixing lamp and/or control the illuminance variable lamp so as to decrease the illuminance of the low accuracy region if the illuminance of the low accuracy region is equal to or greater than the threshold.

According to one aspect of the present invention, there is provided a vehicle lamp system including:

a first lamp capable of performing adjustment such that illuminance or color of any region of an angle of view of a vehicle camera mounted on a vehicle is different from illuminance or color of another region; and a lamp control unit configured to control the first lamp so as to sequentially form a plurality of light distribution patterns different in at least one of the illuminance and color in a low accuracy region, after acquiring, from a vehicle control unit configured to control the vehicle, position information of a low accuracy region where a recognition accuracy of the angle of view of the vehicle camera is equal to or less than a predetermined value.

According to one aspect of the present invention, there is provided a vehicle lamp system including:

an illuminance variable lamp capable of performing adjustment such that illuminance of any region of an angle of view of a vehicle camera mounted on a vehicle is different from illuminance of another region; and a lamp control unit capable of controlling the illuminance variable lamp, in which the lamp control unit is configured to after acquiring, from a vehicle control unit configured to control the vehicle, position information and illuminance of a low accuracy region where a recognition accuracy of the angle of view of the vehicle camera is equal to or less than a predetermined value, determine whether the illuminance of the low accuracy region is less than a threshold, control the illuminance variable lamp so as to increase the illuminance of the low accuracy region if the illuminance of the low accuracy region is less than the threshold, and/or control the illuminance variable lamp so as to decrease the illuminance of the low accuracy region if the illuminance of the low accuracy region is equal to or greater than the threshold.

According to one aspect of the present invention, there is provided a vehicle lamp system including:

an illuminance variable lamp capable of performing adjustment such that illuminance of any region of an angle of view of a vehicle camera mounted on a vehicle is different from illuminance of another region;

an illuminance fixing lamp capable of emitting light with a specific illuminance toward a region including the angle of view of the vehicle camera; and a lamp control unit capable of controlling the illuminance variable lamp and the illuminance fixing lamp, in which the lamp control unit is configured to after acquiring, from a vehicle control unit configured to control the vehicle, position information and illuminance of a low accuracy region where a recognition accuracy of the angle of view of the vehicle camera is equal to or less than a predetermined value, determine whether the illuminance of the low accuracy region is less than a threshold, turn on the illuminance fixing lamp and/or control the illuminance variable lamp so as to increase the illuminance of the low accuracy region if the illuminance of the low accuracy region is less than the threshold, and/or turn off the illuminance fixing lamp and/or control the illuminance variable lamp so as to decrease the illuminance of the low accuracy region if the illuminance of the low accuracy region is equal to or greater than the threshold.

According to one aspect of the present invention, there is provided a vehicle lamp system including:

an illuminance variable lamp capable of performing adjustment such that illuminance of any region of an angle of view of a vehicle camera mounted on a vehicle is different from illuminance of another region; and a lamp control unit capable of controlling the illuminance variable lamp, in which after acquiring, from a vehicle control unit configured to control the vehicle, position information of a low accuracy region where a recognition accuracy of the angle of view of the vehicle camera is equal to or less than a predetermined value, and first recognition accuracy which is the recognition accuracy of the low accuracy region at that time, the lamp control unit is configured to execute the following (1) and/or (2):

(1) controlling the illuminance variable lamp so as to increase the illuminance of the low accuracy region, and acquiring, from the vehicle control unit, second recognition accuracy which is the recognition accuracy of the low accuracy region in this state, in a case where the first recognition accuracy is higher than the second recognition accuracy, controlling the illuminance variable lamp so as to decrease illuminance of the low accuracy region with respect to illuminance when the first recognition accuracy is acquired, and in a case where the second recognition accuracy is higher than the first recognition accuracy, controlling the illuminance variable lamp so as to increase the illuminance of the low accuracy region with respect to the illuminance when the first recognition accuracy is acquired, (2) controlling the illuminance variable lamp so as to decrease the illuminance of the low accuracy region, and acquiring, from the vehicle control unit, second recognition accuracy which is the recognition accuracy of the low accuracy region in this state, in a case where the first recognition accuracy is higher than the second recognition accuracy, controlling the illuminance variable lamp so as to increase illuminance of the low accuracy region with respect to illuminance when the first recognition accuracy is acquired, and in a case where the second recognition accuracy is higher than the first recognition accuracy, controlling the illuminance variable lamp so as to decrease the illuminance of the low accuracy region with respect to the illuminance when the first recognition accuracy is acquired.

According to one aspect of the present invention, there is provided a vehicle lamp system including:

an illuminance variable lamp capable of performing adjustment such that illuminance of any region of an angle of view of a vehicle camera mounted on a vehicle is different from illuminance of another region;

an illuminance fixing lamp capable of emitting light with a specific illuminance toward a region including the angle of view of the vehicle camera; and a lamp control unit capable of controlling the illuminance variable lamp and the illuminance fixing lamp, in which after acquiring, from a vehicle control unit configured to control the vehicle, position information of a low accuracy region where a recognition accuracy of the angle of view of the vehicle camera is equal to or less than a predetermined value, and first recognition accuracy which is the recognition accuracy of the low accuracy region at that time, the lamp control unit is configured to execute the following (3) and/or (4):

(3) controlling at least one of the illuminance variable lamp and the illuminance fixing lamp so as to increase illuminance of the low accuracy region, and acquiring, from the vehicle control unit, second recognition accuracy which is the recognition accuracy of the low accuracy region in this state, in a case where the first recognition accuracy is higher than the second recognition accuracy, turning off the illuminance fixing lamp and/or controlling the illuminance variable lamp so as to decrease illuminance of the low accuracy region with respect to illuminance when the first recognition accuracy is acquired, and/or in a case where the second recognition accuracy is higher than the first recognition accuracy, turning on the illuminance fixing lamp and/or controlling the illuminance variable lamp so as to increase illuminance of the low accuracy region with respect to illuminance when the first recognition accuracy is acquired.

(4) controlling the illuminance variable lamp so as to decrease the illuminance of the low accuracy region, and acquiring, from the vehicle control unit, second recognition accuracy which is the recognition accuracy of the low accuracy region in this state, in a case where the first recognition accuracy is higher than the second recognition accuracy, turning on the illuminance fixing lamp and/or controlling the illuminance variable lamp so as to increase illuminance of the low accuracy region with respect to illuminance when the first recognition accuracy is acquired, and/or in a case where the second recognition accuracy is higher than the first recognition accuracy, turning off the illuminance fixing lamp and/or controlling the illuminance variable lamp so as to decrease illuminance of the low accuracy region with respect to illuminance when the first recognition accuracy is acquired.

Advantageous Effects of Invention

According to the present invention, the vehicle lamp system capable of improving the recognition accuracy of the camera is provided.

BRIEF DESCRIPTION OF DRAWINGS

FIG. 1B is a left side view of the vehicle on which the vehicle lamp system according to the first embodiment of the present invention is mounted.

FIG. 7A is a plan view of a vehicle on which a vehicle lamp system according to a third embodiment of the present invention is mounted.

FIG. 7B is a left side view of the vehicle on which the vehicle lamp system according to the third embodiment of the present invention is mounted.

FIG. 14 is a flowchart executed by a vehicle lamp system according to an eighth embodiment of the present invention.

DESCRIPTION OF EMBODIMENTS

Figure 1A:
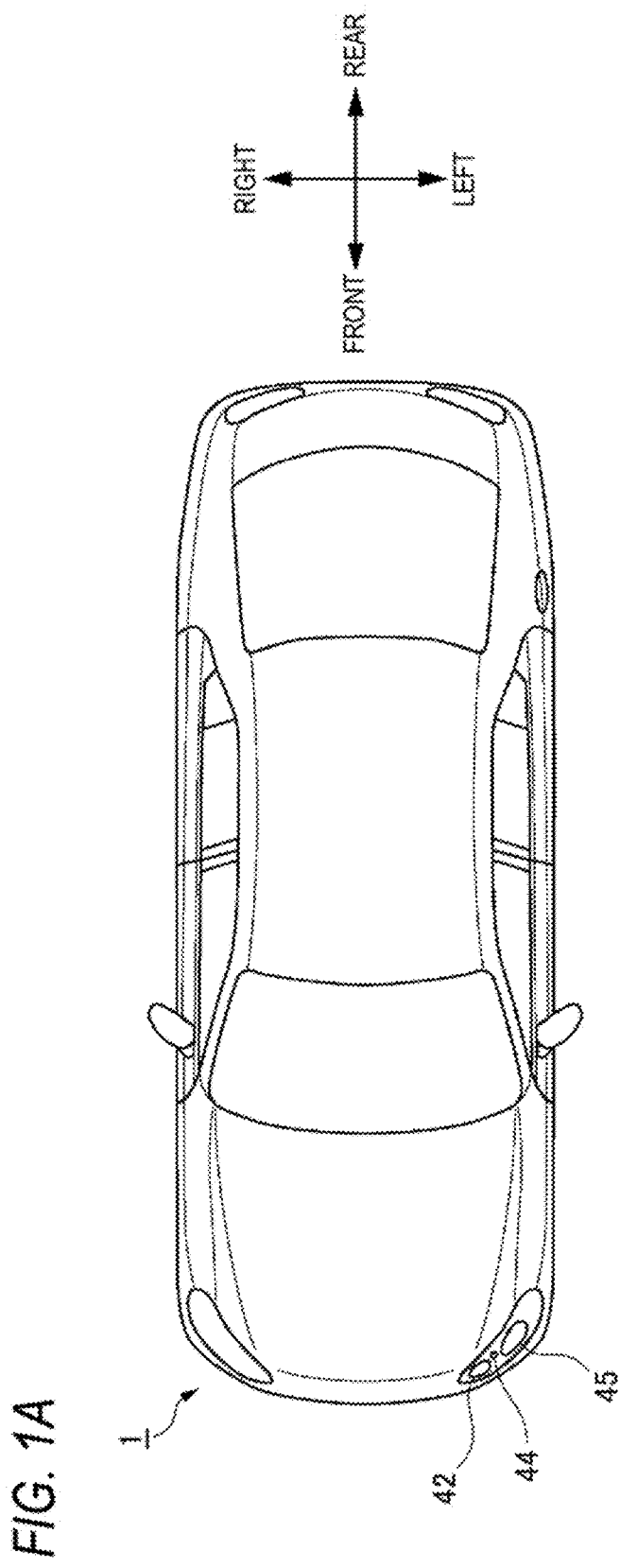
FIG. 1A is a plan view of a vehicle on which a vehicle lamp system according to a first embodiment of the present invention is mounted.

Hereinafter, an embodiment of the present disclosure (hereinafter, referred to as "the present embodiment") will be described with reference to the drawings. Incidentally, members having the same reference numerals as those that have been described in the description of the present embodiment will be omitted for convenience of description. Further, dimensions of members illustrated in the drawings may be different from actual dimensions thereof for convenience of description.

In the description of the present embodiment, a "left-right direction", a "front-rear direction", and an "upper-lower direction" are appropriately referred to for convenience of description. These directions are relative directions set for a vehicle 1 illustrated in FIGS. 1A and 1B. Here, the "upper-lower direction" is a direction including an "upper direction" and a "lower direction". The "front-rear direction" is a direction including a "front direction" and a "rear direction". The "left-right direction" is a direction including a "left direction" and a "right direction".

First Embodiment

A vehicle lamp system 100 according to a first embodiment of the present invention will be described below. FIG. 1A is a front view of the vehicle 1, and FIG. 1B is a left side view of the vehicle 1. The vehicle 1 is a vehicle capable of traveling in an automatic driving mode. The vehicle 1 includes a lamp device 4. The lamp device 4 includes an illuminance variable lamp 42 and a lamp-mounted camera 44. In the present embodiment, the lamp device 4 is provided at a left front portion of the vehicle 1. In the present embodiment, the illuminance variable lamp 42 and the lamp-mounted camera 44 are provided inside a common housing.

The illuminance variable lamp 42 can emit light toward an entire angle of view of a vehicle camera 6 and can perform adjustment such that illuminance of any region is different from illuminance of another region. The illuminance variable lamp 42 is, for example, a laser scanning device including a laser light source and a light deflection device which deflects laser light emitted from the laser light source. The light deflection device is, for example, a movable mirror such as a micro electro mechanical systems (MEMS) mirror or a Galvano mirror. The illuminance variable lamp 42 can emit light of desired illuminance to a desired position by adjusting a current value supplied to the laser light source or driving the movable mirror to a desired posture.

The lamp-mounted camera 44 is a camera provided separately from the vehicle camera 6, which will be described later, mounted on the vehicle 1 and connected to a vehicle control unit 3.

Figure 2:
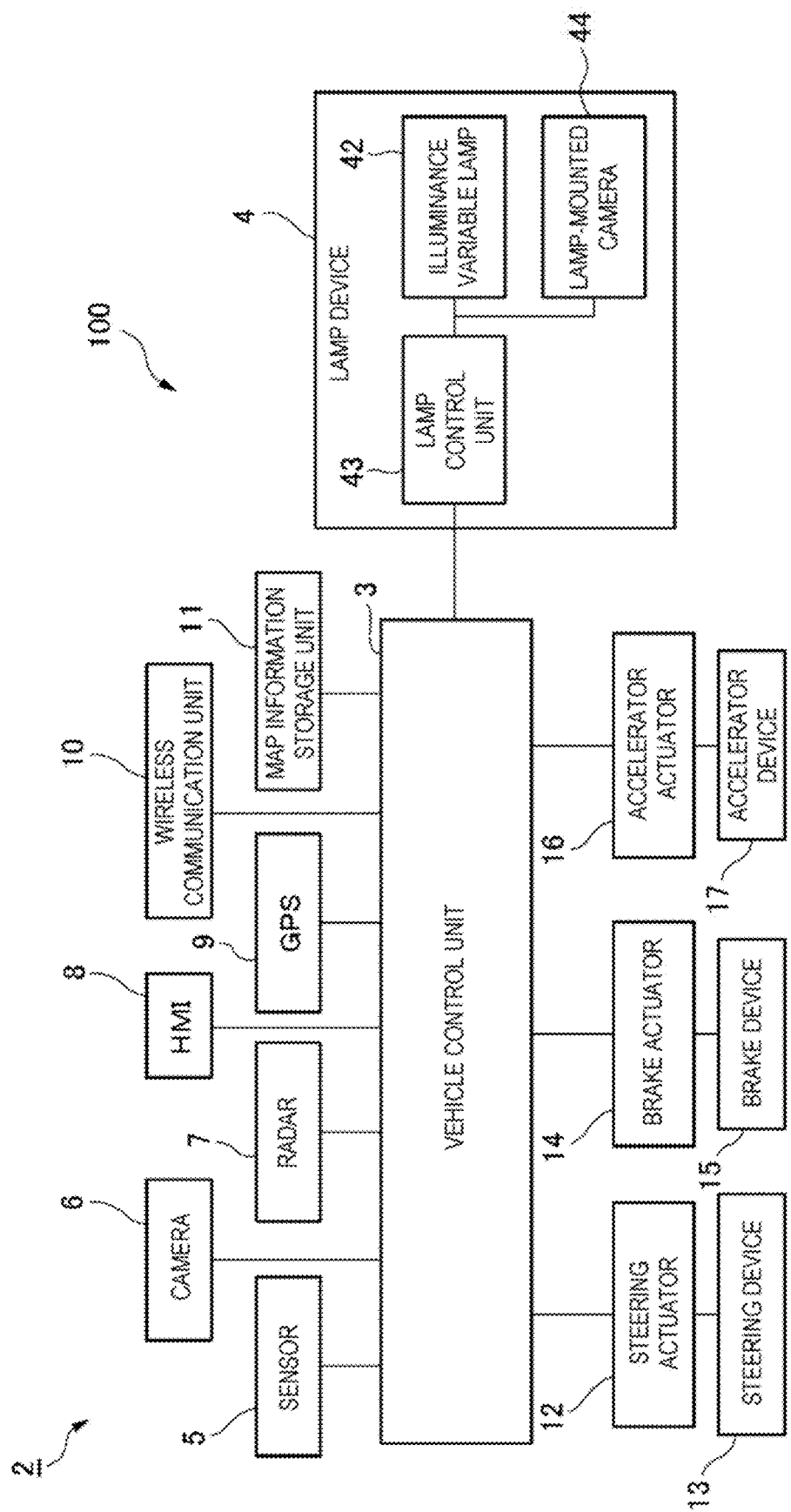
FIG. 2 is a block diagram of a vehicle system including the vehicle lamp system according to the first embodiment of the present invention.

Next, a vehicle system 2 of the vehicle 1 will be described with reference to FIG. 2. FIG. 2 is a block diagram of the vehicle system 2. As illustrated in FIG. 2, the vehicle system 2 includes a vehicle control unit 3, a lamp system 100, a sensor 5, a vehicle camera 6, a radar 7, a human machine interface (HMI) 8, a Global Positioning System (GPS) 9, a wireless communication unit 10 (a first wireless communication unit), and a map information storage unit 11. The vehicle system 2 further includes a steering actuator 12, a steering device 13, a brake actuator 14, a brake device 15, an accelerator actuator 16, and an accelerator device 17.

The vehicle control unit 3 controls traveling of the vehicle 1. The vehicle control unit 3 is implemented by an electronic control unit (ECU). The electronic control unit includes a processor such as a central processing unit (CPU), a read only memory (ROM) in which various vehicle control programs are stored, and a random access memory (RAM) in which various kinds of vehicle control data are temporarily stored. The processor loads a program designated from the various vehicle control programs stored in the ROM onto the RAM and executes various kinds of processing in cooperation with the RAM.

The lamp system 10 includes the lamp device 4. The lamp device 4 includes the illuminance variable lamp 42, the lamp-mounted camera 44, and a lamp control unit 43. The lamp control unit 43 is implemented by an electronic control unit (ECU). The lamp control unit 43 communicates with the vehicle control unit 3 and the lamp-mounted camera 44.

The lamp control unit 43 controls the illuminance variable lamp 42 to control a direction and a luminous intensity of the light emitted from the illuminance variable lamp 42. The lamp control unit 43 and the vehicle control unit 3 may be implemented by the same electronic control unit.

The sensor 5 includes an acceleration sensor, a speed sensor, a gyro sensor, and the like. The sensor 5 detects a traveling state of the vehicle 1 and outputs traveling state information to the vehicle control unit 3. The sensor 5 may further include a seating sensor which detects whether a driver sits on a driver seat, a face direction sensor which detects a direction of a face of the driver, an external weather sensor which detects an external weather condition, a human sensor which detects whether there is a person in the vehicle, and the like.

The vehicle camera 6 is, for example, a camera including an imaging element such as a charge-coupled device (CCD) or a complementary MOS (CMOS). The radar 7 is a millimeter wave radar, a microwave radar, a laser radar, and the like. The vehicle camera 6 and/or the radar 7 detect a surrounding environment of the vehicle 1 (another vehicle, a pedestrian, a road shape, a traffic sign, an obstacle, and the like), and output surrounding environment information to the vehicle control unit 3.

The HMI 8 includes an input unit which receives an input operation from the driver, and an output unit which outputs traveling information and the like to the driver. The input unit includes a steering wheel, an accelerator pedal, a brake pedal, a driving mode changeover switch which switches a driving mode of the vehicle 1, and the like. The output unit is a display which displays various kinds of traveling information.

The GPS 9 acquires current position information of the vehicle 1 and outputs the acquired current position information to the vehicle control unit 3. The wireless communication unit 10 (a first wireless communication unit) receives information (for example, traveling information and the like) about the other vehicle around the vehicle 1 from the other vehicle, and transmits information about the vehicle 1 (for example, traveling information and the like) to the other vehicle (inter-vehicle communication). The wireless communication unit 10 receives infrastructure information from infrastructure equipment such as a traffic light and a sign lamp, and transmits the traveling information of the vehicle 1 to the infrastructure equipment (road-to-vehicle communication). The vehicle 1 may directly communicate with the other vehicle or the infrastructure equipment, or may communicate with the other vehicle or the infrastructure equipment via a wireless communication network. The map information storage unit 11 is an external storage device such as a hard disk drive in which map information is stored, and outputs the map information to the vehicle control unit 3.

When the vehicle 1 travels in the automatic driving mode, the vehicle control unit 3 automatically generates at least one of a steering control signal, an accelerator control signal, and a brake control signal based on the traveling state information, the surrounding environment information, the current position information, the map information, and the like. The steering actuator 12 receives the steering control signal from the vehicle control unit 3 and controls the steering device 13 based on the received steering control signal. The brake actuator 14 receives the brake control signal from the vehicle control unit 3 and controls the brake device 15 based on the received brake control signal. The accelerator actuator 16 receives the accelerator control signal from the vehicle control unit 3 and controls the accelerator device 17 based on the received accelerator control signal. In this way, traveling of the vehicle 1 is automatically controlled by the vehicle system 2 in the automatic driving mode.

On the other hand, when the vehicle 1 travels in a manual driving mode, the vehicle control unit 3 generates a steering control signal, an accelerator control signal, and a brake control signal according to a manual operation of the driver on the accelerator pedal, the brake pedal, and the steering wheel. In this way, since the steering control signal, the accelerator control signal, and the brake control signal are generated by the manual operation of the driver, the traveling of the vehicle 1 is controlled by the driver in the manual driving mode.

Next, the driving mode of the vehicle 1 will be described. The driving mode includes the automatic driving mode and the manual driving mode. The automatic driving mode includes a fully automatic driving mode, an advanced driving support mode, and a driving support mode. In the fully automatic driving mode, the vehicle system 2 automatically executes all kinds of traveling control including steering control, brake control, and accelerator control, and the driver cannot drive the vehicle 1. In the advanced driving support mode, the vehicle system 2 automatically executes all kinds of traveling control including the steering control, the brake control, and the accelerator control, and the driver can drive the vehicle 1 but does not drive the vehicle 1. In the driving support mode, the vehicle system 2 automatically executes a part of traveling control including the steering control, the brake control, and the accelerator control, and the driver drives the vehicle 1 under the driving support of the vehicle system 2. On the other hand, in the manual driving mode, the vehicle system 2 does not automatically execute the traveling control, and the driver drives the vehicle 1 without the driving support of the vehicle system 2.

The driving mode of the vehicle 1 may be switched by operating the driving mode changeover switch. In this case, the vehicle control unit 3 switches the driving mode of the vehicle 1 among the four driving modes (the fully automatic driving mode, the advanced driving support mode, the driving support mode, and the manual driving mode) according to an operation of the driver on the driving mode changeover switch. The driving mode of the vehicle 1 may be automatically switched based on information about a travelable section where an automatic driving vehicle can travel or a traveling prohibited section where traveling of the automatic driving vehicle is prohibited, or information about the external weather condition. In this case, the vehicle control unit 3 switches the driving mode of the vehicle 1 based on the information described above. Further, the driving mode of the vehicle 1 may be automatically switched by using the seating sensor, the face direction sensor, and the like. In this case, the vehicle control unit 3 switches the driving mode of the vehicle 1 based on an output signal from the seating sensor or the face direction sensor.

Figure 3:
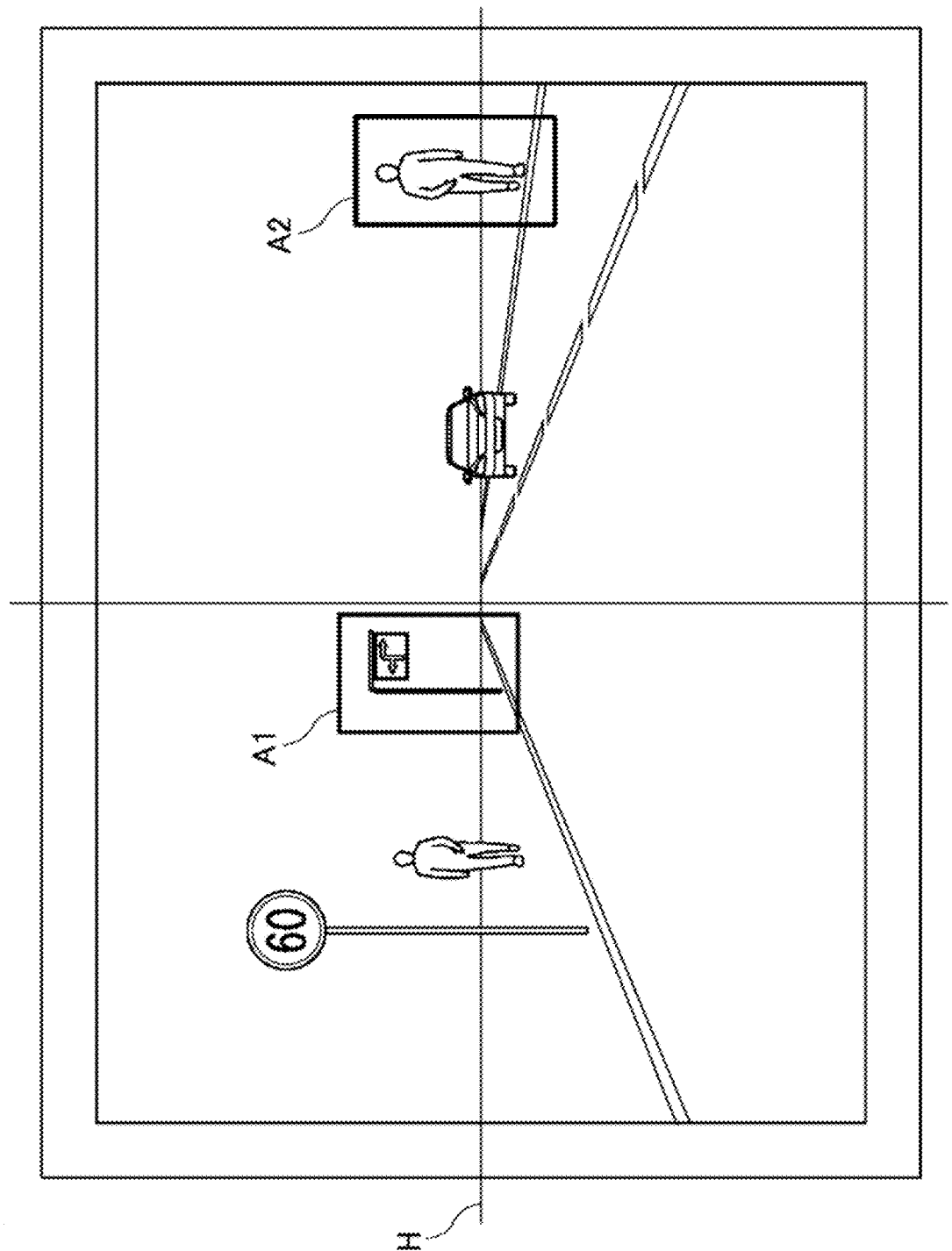
FIG. 3 is a diagram illustrating an image acquired by a vehicle camera.
Figure 4:
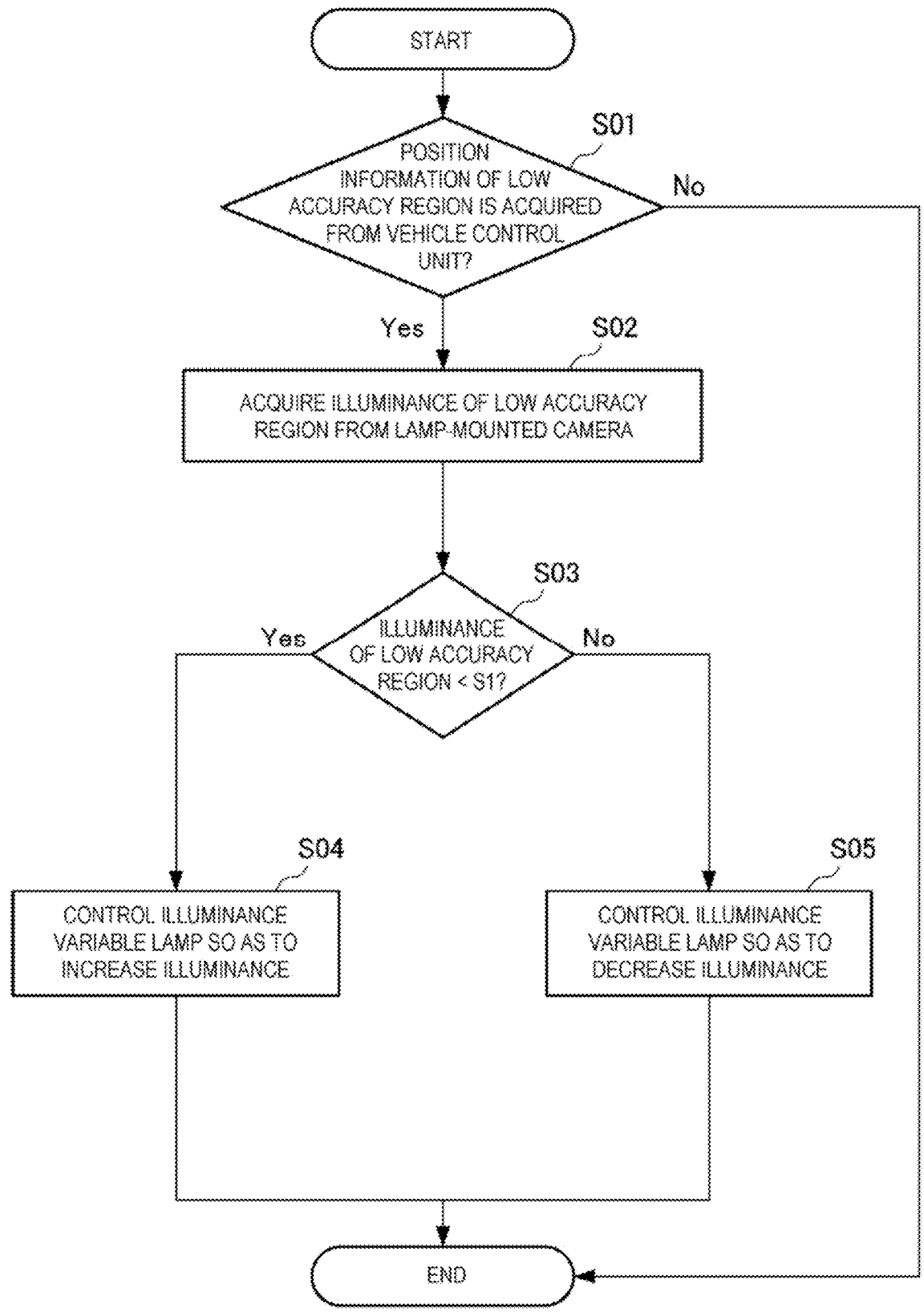
FIG. 4 is a flowchart executed by the vehicle lamp system according to the first embodiment of the present invention.

Next, processing executed by the lamp control unit 43 according to the present embodiment will be described using FIGS. 3 and 4. FIG. 3 is a diagram illustrating an image acquired by the vehicle camera 6. FIG. 4 is a flowchart illustrating the processing executed by the lamp control unit 43 according to the present embodiment.

In the present embodiment, the vehicle control unit 3 executes the fully automatic driving mode, the advanced driving support mode, and the driving support mode based on the image acquired by the vehicle camera 6. The vehicle control unit 3 identifies an object such as a pedestrian, an oncoming vehicle, or a sign from the image acquired by the vehicle camera 6.

FIG. 3 is a diagram illustrating the image acquired by the vehicle camera 6. As illustrated in FIG. 3, there is a sign in front of the vehicle in an area A1. There is a pedestrian on a right side in front of the vehicle in an area A2.

When the vehicle control unit 3 tries to identify the object such as a sign or a pedestrian, it may be difficult to identify the object from the image acquired by the vehicle camera 6. For example, it may be difficult to identify the object when light emitted from the own vehicle hardly reaches the pedestrian illustrated in FIG. 3 and the pedestrian is too dark (blackout). Alternatively, since the sign has a high reflectance, it may be difficult to read a mark displayed on the sign because a reflective light is too bright (whiteout). When it is determined from the image acquired by the vehicle camera 6 that the object is a specific object, if a degree of certainty exceeds a predetermined value (a threshold), the vehicle control unit 3 determines that the object is a specific object. The degree of certainty is called recognition accuracy.

When it is determined from the image acquired by the vehicle camera 6 that there is something, the vehicle control unit 3 attempts to identify the object and identifies position information of the object. A region where the recognition accuracy is lower than the predetermined value and the object cannot be distinguished is referred to as a low accuracy region in the following description. The vehicle control unit 3 transmits the position information of the low accuracy region to the lamp control unit 43 when the low accuracy region is generated.

The position information in the low accuracy region is, for example, $\theta$ (azimuth angle) and $\varphi$ (elevation angle) when the object is specified by coordinates $(r, \theta, \varphi)$ around the vehicle camera 6. Incidentally, r represents a distance to the object. For example, when the region A1 including the sign in FIG. 3 is determined to be the low accuracy region, the vehicle control unit 3 transmits information of $\theta$ being $-5°$ to $-1°$ and $\varphi$ being $-2°$ to $+3°$ as position information of the low accuracy region A1 to the lamp control unit 43.

Alternatively, for example, when the vehicle control unit 3 cannot determine an object in a region from row A and column B to row C to column D of pixels of the vehicle camera 6, the region from row A and column B to row C and column D is the position information of the low accuracy region. A row direction is associated with, for example, a height direction of the vehicle 1. A column direction is associated with, for example, a horizontal direction of the vehicle 1.

Alternatively, when the vehicle camera 6 is virtually divided into F pixels in the row direction and G pixels in the column direction, and the vehicle control unit 3 cannot determine an object in a section located at the $m^{th}$ row and the $n^{th}$ column, the section located at the $m^{th}$ row and the $n^{th}$ column is the position information of the low accuracy region. The row direction is associated with, for example, the height direction of the vehicle 1. The column direction is associated with, for example, the horizontal direction of the vehicle 1.

Further, since the own vehicle travels and the object moves, the position of the low accuracy region changes every moment. Therefore, the position information may be a function of a time determined according to an estimated relative speed between the own vehicle and the object.

As illustrated in FIG. 4, first, after the lamp control unit 43 acquires the position information of the low accuracy region from the vehicle control unit 3, the lamp control unit 43 executes the following processing (step S01: Yes). When the position information of the low accuracy region is not acquired from the vehicle control unit 3, the lamp control unit 43 does not execute the following processing (step S01: No).

Next, the lamp control unit 43 acquires illuminance of the low accuracy region from the lamp-mounted camera 44 (step S02). An angle of view of the lamp-mounted camera 44 is equal to or larger than the angle of view of the vehicle camera 6. Therefore, the lamp-mounted camera 44 can acquire information of any region of the vehicle camera 6. The lamp control unit 43 specifies illuminance of the region corresponding to the low accuracy region based on the image acquired by the lamp-mounted camera 44. The illuminance of the region can be obtained, for example, as an average value, a maximum value, or a minimum value of luminance of the pixels belonging to the low accuracy region among the pixels of the lamp-mounted camera 44.

Next, the lamp control unit 43 determines whether the illuminance of the specified low accuracy region is less than a threshold S1 (step 03). When the lamp control unit 43 determines that the illuminance of the low accuracy region is less than the threshold S1 (step S03: Yes), the lamp control unit 43 controls the illuminance variable lamp 42 to increase the illuminance of the low accuracy region (step S04). When the illuminance of the low accuracy region is less than the threshold S1, it means that the low accuracy region is dark. That is, the recognition accuracy is low since the low accuracy region is dark. Therefore, when step S04 is executed, the illuminance variable lamp 42 illuminates the low accuracy region at illuminance higher than the illuminance of the low accuracy region when the vehicle control unit 3 determines that the recognition accuracy is low, so that the recognition accuracy is increased.

On the other hand, when the lamp control unit 43 determines that the illuminance of the low accuracy region is equal to or greater than the threshold S1 (step S03: No), the lamp control unit 43 controls the illuminance variable lamp 42 to decrease the illuminance of the low accuracy region (step S05). When the illuminance of the low accuracy region is equal to or greater than the threshold S1, it means that the low accuracy region is bright. That is, the recognition accuracy is low since the low accuracy region is too bright. Therefore, when step S05 is executed, the illuminance variable lamp 42 illuminates the low accuracy region at illuminance lower than the illuminance of the low accuracy region when the vehicle control unit 3 determines that the recognition accuracy is low, so that the recognition accuracy is increased.

In the illuminance variable lamp 42 which is the laser scanning device of the present embodiment, the laser light source emits the laser light. Further, an emitting range is scanned with the laser light by moving the movable mirror. In the present embodiment, the expression "the illuminance variable lamp 42 is controlled so as to increase the illuminance of the low accuracy region" means that the lamp control unit 43 increases the amount of energization supplied to the laser light source when the movable mirror is moved to a position of the low accuracy region irradiated with the laser light. On the other hand, the expression "the illuminance variable lamp 42 is controlled so as to decrease the illuminance of the low accuracy region" means that the lamp control unit 43 decreases the amount of energization supplied to the laser light source when the movable mirror is moved to the position of the low accuracy region irradiated with the laser light.

Steps S01 to S05 described above are repeatedly executed at predetermined intervals. The predetermined interval is 1 second or less, preferably 0.1 second or less.

Further, the processing of steps S02 to S05 may be repeated while the lamp control unit 43 acquires the position information of the low accuracy region from the vehicle control unit 3.

Alternatively, when the lamp control unit 43 acquires the position information of the low accuracy region from the vehicle control unit 3, the illuminance of the low accuracy region is acquired by referring to the information acquired by the lamp-mounted camera 44, and the illuminance of the low accuracy region is adjusted by the illuminance variable lamp 42 such that the recognition accuracy is increased according to the illuminance of the low accuracy region. This adjustment may be continued for a predetermined number of times or a predetermined period of time. According to this aspect, when the position information of the low accuracy region is acquired at a certain time, the recognition accuracy can be continuously increased by repeating Step S04 or S05 a predetermined number of times regardless of whether the information about the low accuracy region is acquired from the vehicle control unit 3.

The low accuracy region is a region which moves with time. Therefore, it is preferable that the lamp control unit 43 continuously acquires the position information of the low accuracy region and controls the illuminance variable lamp 42 so as to emit the light toward the moving low accuracy region. For example, it is preferable that the position information of the low accuracy region is acquired from the vehicle control unit 3 immediately before the execution of steps S04 and S05, and the illuminance variable lamp 42 is controlled based on the position information. However, when steps S01 to S05 are processed at a sufficiently high speed, the control of the illuminance variable lamp 42 in steps S04 and S05 may be performed based on the position information of the low accuracy region acquired in step S01.

Second Embodiment

In the embodiment described above, an example in which the vehicle lamp system 10 includes only the illuminance variable lamp 42 is described, but the vehicle lamp system can also be configured in combination with a headlamp 45 (an illuminance fixing lamp) capable of emitting light with a specific illuminance toward an area including the angle of view of the vehicle camera 6.

Figure 5:
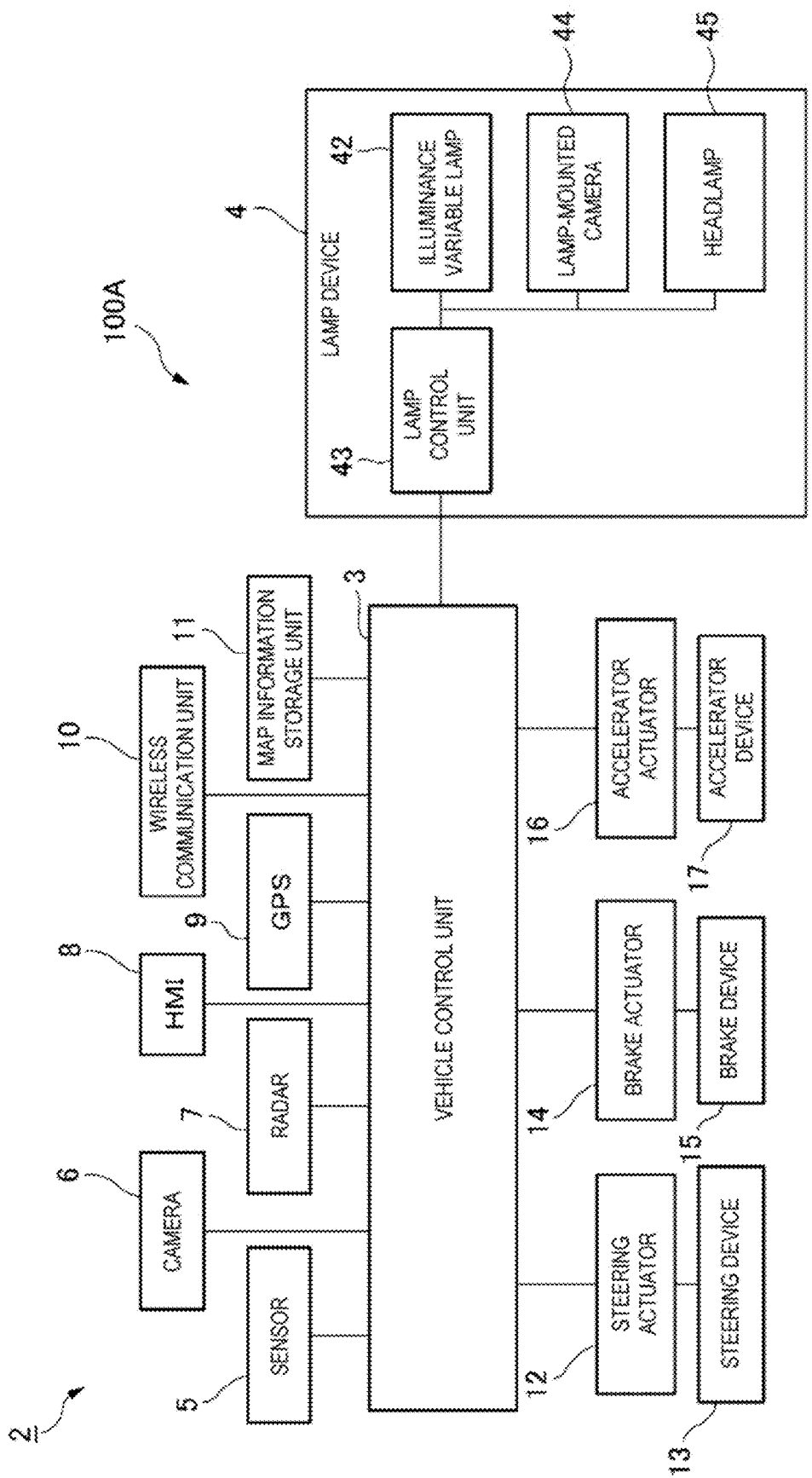
FIG. 5 is a block diagram of a vehicle system including a vehicle lamp system according to a second embodiment of the present invention.

FIG. 5 is a block diagram of a vehicle system including a vehicle lamp system 100A according to a second embodiment of the present invention. As illustrated in FIG. 5, in the second embodiment, the vehicle lamp system 100A includes the headlamp 45 in addition to the configuration of the vehicle lamp system 100 of the first embodiment described above. The lamp control unit 43 is electrically connected to the headlamp 45. The lamp control unit 43 can control the headlamp 45. A known headlamp can be used as the headlamp 45. The headlamp 45 can form a high beam light distribution pattern and a low beam light distribution pattern. Further, the lamp control unit 43 controls the headlamp 45 to form the high beam light distribution pattern, form the low beam light distribution pattern, or turn itself off.

Figure 6:
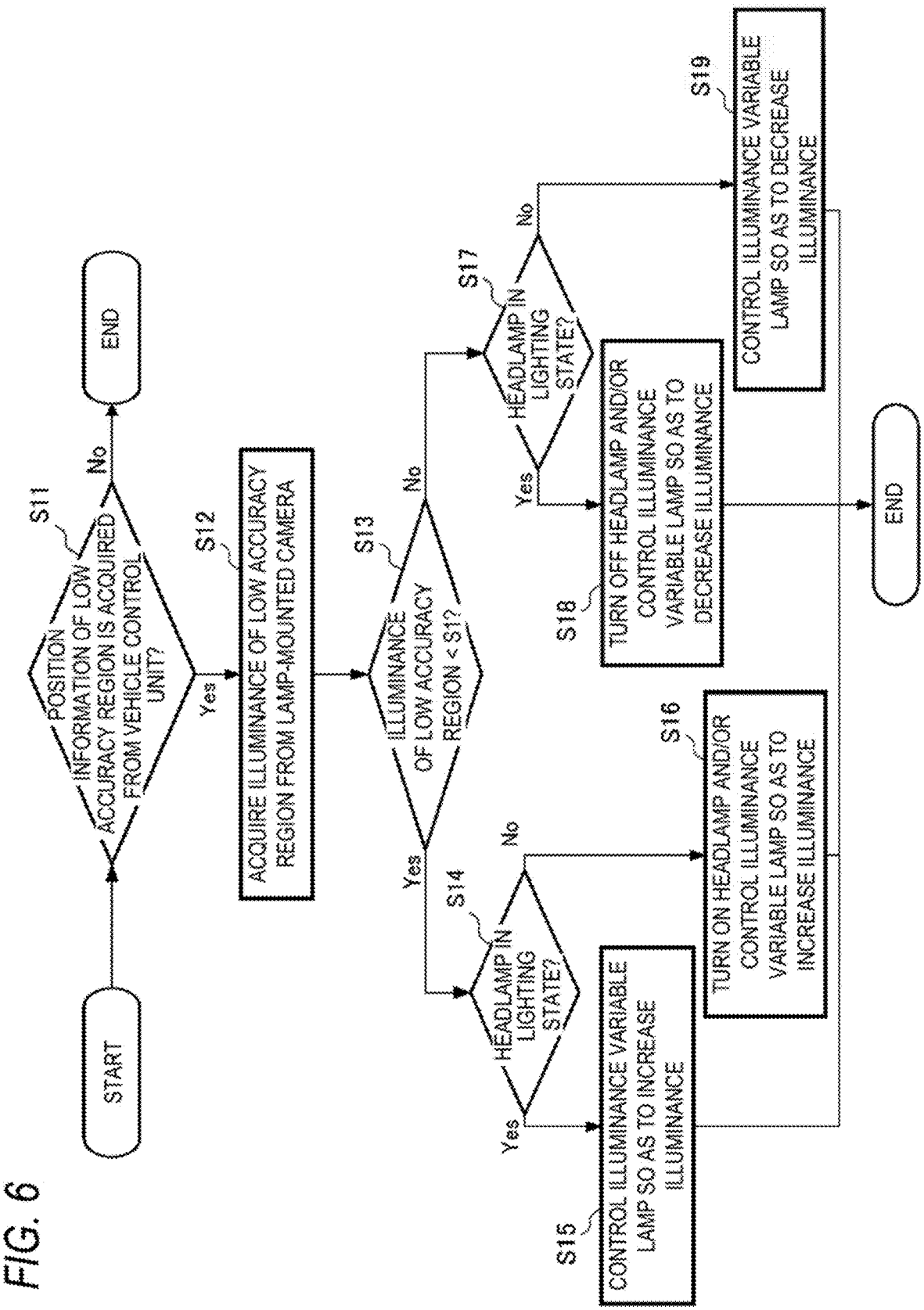
FIG. 6 is a flowchart executed by the vehicle lamp system according to the second embodiment of the present invention.

FIG. 6 is a flowchart executed by the vehicle lamp system 100A according to the second embodiment. As illustrated in FIG. 6, since steps S11 to S13 executed by the lamp control unit 43 are the same as steps S01 to S03 of the first embodiment described above, a description thereof will be omitted.

When the illuminance of the low accuracy region is less than the threshold S1 (step S13: Yes), the lamp control unit 43 determines whether the headlamp 45 is in a lighting state (step S14).

When the illuminance of the low accuracy region is less than the threshold S1 (step S13: Yes) and the headlamp 45 is in the lighting state (step S14: Yes), the lamp control unit 43 controls the illuminance variable lamp 42 to increase the illuminance of the low accuracy region (step S15). When the illuminance of the low accuracy region is less than the threshold S1, the low accuracy region is too dark and it may be difficult for the vehicle control unit 3 to identify the object. When step S15 is executed, the illuminance variable lamp 42 illuminates the low accuracy region at illuminance higher than the illuminance of the low accuracy region when the vehicle control unit 3 determines that the recognition accuracy is low, so that the recognition accuracy is increased.

When the illuminance of the low accuracy region is less than the threshold S1 (step S13: Yes) and the headlamp 45 is in an OFF state (step S14: No), the lamp control unit 43 turns on the headlamp 45 and/or controls the illuminance variable lamp 42 so as to increase the illuminance of the low accuracy region (step S16).

In a case where the low accuracy region is too dark when the headlamp 45 is in the OFF state and the recognition accuracy is low, the low accuracy region can be brightly illuminated by turning on the headlamp 45, so that the recognition accuracy can be increased. Alternatively, by increasing the amount of energization supplied to the light source of the illuminance variable lamp 42 without turning on the headlamp 45, the low accuracy region can be brightly illuminated, so that the recognition accuracy can also be increased. Alternatively, by turning on the headlamp 45 and increasing the amount of energization supplied to the light source of the illuminance variable lamp 42, the low accuracy region can be brightly illuminated, so that the recognition accuracy can also be increased.

The lamp control unit 43 may be configured to always execute one of turning on only the headlamp 45 and increasing the amount of energization supplied to the light source of the illuminance variable lamp 42.

Alternatively, the lamp control unit 43 may be configured to select and execute one of turning on only the headlamp 45 and increasing the amount of energization supplied to the light source of the illuminance variable lamp 42 according to other external information. The other external information includes, for example, an average illuminance around the vehicle, time, weather, a traveling speed of the own vehicle, and exposure time of the vehicle camera 6. For example, in a situation where the surroundings are dark, when the headlamp 45 is turned on, recognition accuracy of a region other than the low accuracy region can be increased. Alternatively, when the traveling speed of the own vehicle is high, the exposure time of the vehicle camera 6 is set to be short. When the exposure time of the vehicle camera 6 is short, luminance of all pixels of the vehicle camera 6 tends to be low in general. Therefore, when the headlamp 45 is turned on, the recognition accuracy of the region other than the low accuracy region can be increased.

When the illuminance of the low accuracy region is equal to or greater than the threshold S1 (step S13: No) and the headlamp 45 is in the lighting state (step S17: Yes), the lamp control unit 43 turns off the headlamp 45 and/or controls the illuminance variable lamp 42 so as to decrease the illuminance of the low accuracy region (step S18). When the illuminance of the low accuracy region is equal to or greater than the threshold S1, the low accuracy region is too bright and it may be difficult for the vehicle control unit 3 to identify the object. When step S18 is executed, since the low accuracy region is illuminated with the illuminance lower than the illuminance of the low accuracy region when the vehicle control unit 3 determines that the recognition accuracy is low, the recognition accuracy is increased.

When the illuminance of the low accuracy region is equal to or greater than the threshold S1 (step S13: No) and the headlamp 45 is in the OFF state (step S17: No), the lamp control unit 43 controls the illuminance variable lamp 42 so as to decrease the illuminance of the low accuracy region (step S19).

When the headlamp 45 is too bright in the lighting state and the recognition accuracy is low, the low accuracy region can be darkened by turning off the headlamp 45, so that the recognition accuracy can be increased. Alternatively, by decreasing the amount of energization supplied to the light source of the illuminance variable lamp 42 without turning off the headlamp 45, the low accuracy region can be darkened, so that the recognition accuracy can also be increased. Alternatively, by turning off the headlamp 45 and decreasing the amount of energization supplied to the light source of the illuminance variable lamp 42, the low accuracy region can be darkened, so that the recognition accuracy can also be increased.

The lamp control unit 43 may be configured to always execute one of only turning off the headlamp 45 and decreasing the amount of energization supplied to the light source of the illuminance variable lamp 42.

Alternatively, the lamp control unit 43 may be configured to select and execute one of only turning off the headlamp 45 and decreasing the amount of energization supplied to the light source of the illuminance variable lamp 42 according to the other external information.

Steps S11 to S19 described above are repeatedly executed at predetermined intervals. The predetermined interval is 1 second or less, preferably 0.1 second or less.

Further, the processing of steps S12 to S19 may be repeated while the lamp control unit 43 acquires the position information of the low accuracy region from the vehicle control unit 3.

Alternatively, when the lamp control unit 43 acquires the position information of the low accuracy region from the vehicle control unit 3, the lamp control unit 43 acquires the illuminance of the low accuracy region by referring to the information acquired by the lamp-mounted camera 44, and controls the illuminance variable lamp 42 and/or the headlamp 45 so as to adjust the illuminance in the low accuracy region in order to increase the recognition accuracy according to the illuminance of the low accuracy region. This control may be continued for a predetermined number of times or a predetermined period of time. According to this aspect, when the position information of the low accuracy region is acquired at a certain time, the recognition accuracy can be continuously increased by repeating steps S12 to S19 a predetermined number of times regardless of whether the information about the low accuracy region is acquired from the vehicle control unit 3.

The low accuracy region is a region which moves with time. Therefore, it is preferable that the lamp control unit 43 continuously acquires the position information of the low accuracy region and controls the illuminance variable lamp 42 so as to emit the light toward the moving low accuracy region. For example, it is preferable that the position information of the low accuracy region is acquired from the vehicle control unit 3 immediately before the execution of steps S15, S16, S18 and S19, and the illuminance variable lamp 42 is controlled based on the position information. However, when steps S11 to S19 are processed at a sufficiently high speed, the control of the illuminance variable lamp 42 in steps S15, S16, S18 and S19 may be performed based on the position information of the low accuracy region acquired in step S11.

As illustrated in FIG. 3, when there are a plurality of low accuracy regions A1, A2, the lamp control unit 43 performs the processing described above for each of the low accuracy regions. As illustrated in FIG. 3, even in a case where the region A1 which is too bright and has a low recognition accuracy and the region A2 which is too dark and has a low recognition accuracy coexist, the recognition accuracy of each region can be increased according to the embodiment described above.

In the first embodiment and the second embodiment described above, an example in which the vehicle camera 6 is a camera which acquires information in front of the vehicle has been described. However, the vehicle camera according to the present invention is not limited to a vehicle camera which acquires information in front of the vehicle. For example, the vehicle camera may be a rear camera which acquires information behind the vehicle, or a side camera which acquires information on a left side or a right side of the vehicle. In a case where the vehicle camera is a rear camera, the illuminance fixing lamp described above is a lamp which emits light of a certain intensity to the rear of the vehicle. In a case where the vehicle camera is a side camera, the illuminance fixing lamp described above is a lamp which emits light of a certain intensity to the left side or the right side of the vehicle.

Further, the vehicle camera is not limited to a camera which can receive visible light. The vehicle camera may be an infrared camera. In a case where the vehicle camera is the infrared camera, the illuminance variable lamp can be implemented by a lamp capable of emitting infrared rays.

In the embodiment described above, an example has been described in which the lamp device 4 includes the illuminance variable lamp 42, the lamp-mounted camera 44, and the headlamp 45, and the illuminance variable lamp 42, the lamp-mounted camera 44, and the headlamp 45 are provided inside the common housing. However, the present invention is not limited thereto. The illuminance variable lamp 42, the lamp-mounted camera 44, and the headlamp 45 may be independently attached to the vehicle.

Further, in the embodiment described above, a case where the illuminance variable lamp 42 is the laser scanning device has been described, but the type of the illuminance variable lamp is not particularly limited. For example, the illuminance variable lamp may be a lamp including a plurality of LED light sources. In this case, the region to which the illuminance variable lamp emits light is virtually divided into a plurality of regions, and the plurality of LED light sources can emit light to the respective regions. Each region to which the LED light source is capable of emitting light is associated with a region where the low accuracy region of the vehicle camera is recognized. In the vehicle lamp system configured as described above, the control described above can be executed by controlling the amount of energization supplied to the LED light source which emits light to the low accuracy region and a designated region.

Third Embodiment

Vehicle lamp systems 100B, 100C according to a third embodiment and a fourth embodiment of the present invention will be described using FIGS. 7A to 10.

Figure 8:
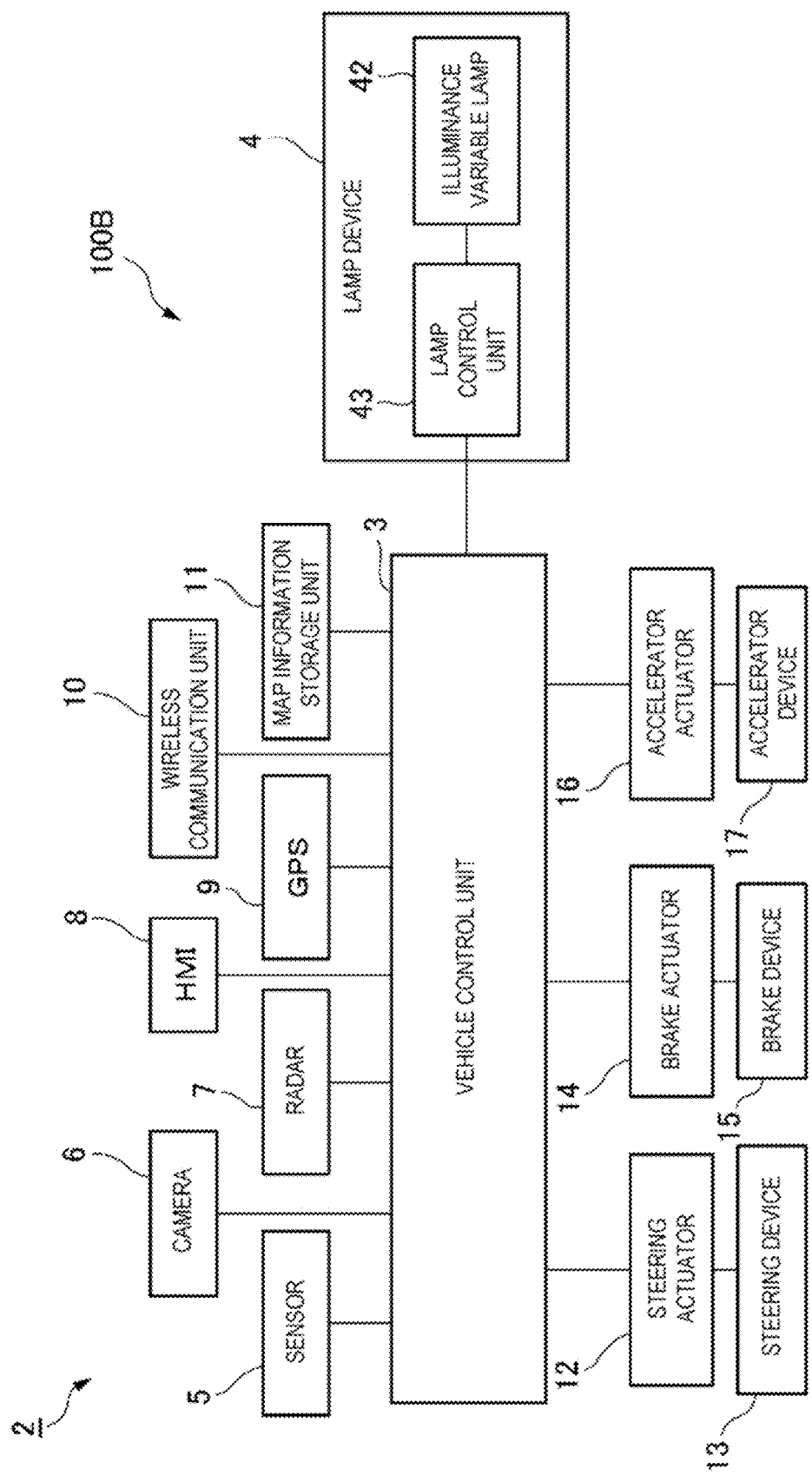
FIG. 8 is a block diagram of a vehicle system including the vehicle lamp system according to the third embodiment of the present invention.

FIGS. 7A and 7B are views illustrating the vehicle 1 on which the vehicle lamp system 100B according to the third embodiment is mounted, FIG. 7A is a front view, and FIG. 7B is a left side view. The vehicle 1 on which the vehicle lamp system 100B of the present embodiment is mounted illustrated in FIGS. 7A, 7B, and 8 is different from the vehicle 1 on which the vehicle lamp system 100 of the first embodiment illustrated in FIGS. 1A, 1B, and 2 in that the lamp-mounted camera 44 is not provided. Of the vehicle lamp system 100B of the present embodiment, a description of similar functions and members as those of the vehicle lamp system 100 of the first embodiment described above will be omitted. Common members are denoted by the same reference numerals.

Further, the lamp control unit 43 according to the present embodiment acquires position information of a low angle region from the vehicle control unit 3 as described with reference to FIG. 3. The vehicle lamp system 100B according to the third embodiment is different from the first embodiment and the second embodiment in a flow to be executed after acquiring the position information of the low angle region.

Figure 9:
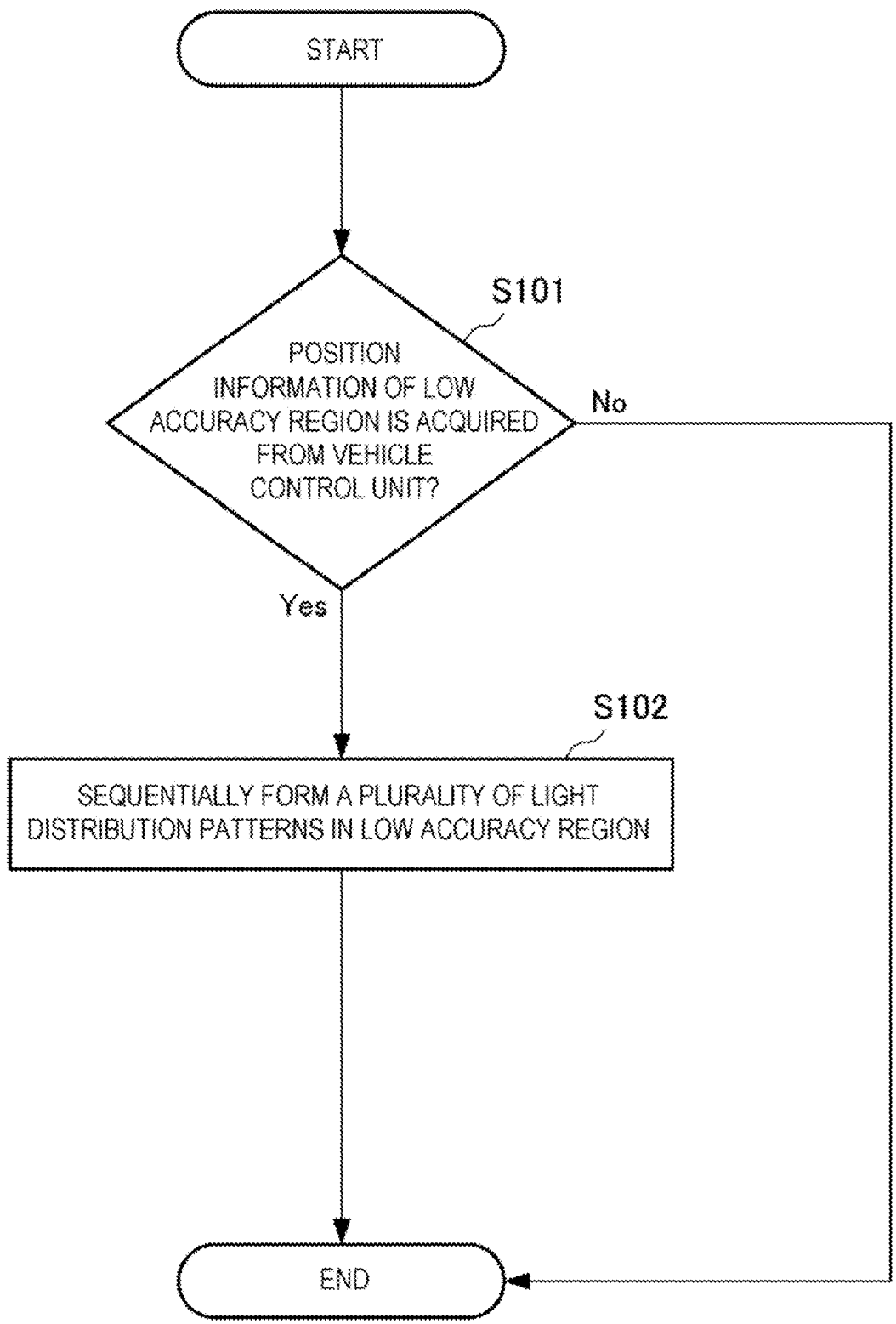
FIG. 9 is a flowchart executed by the vehicle lamp system according to the third embodiment of the present invention.

As illustrated in FIG. 9, first, after the lamp control unit 43 acquires the position information of the low accuracy region from the vehicle control unit 3, the lamp control unit 43 executes the following processing (step S101: Yes). When the position information of the low accuracy region is not acquired from the vehicle control unit 3, the lamp control unit 43 does not execute the following processing (step S101: No).

Next, the lamp control unit 43 sequentially forms a plurality of light distribution patterns in the low accuracy region (step S102).

Sequentially forming the plurality of light distribution patterns in the low accuracy region means illuminating the low accuracy region while changing a luminous intensity of the light source of the illuminance variable lamp 42. Changing the luminous intensity means increasing the luminous intensity or decreasing the luminous intensity. The luminous intensity may be changed stepwise or continuously. Alternatively, the luminous intensity may be changed randomly.

Sequentially forming the plurality of light distribution patterns in the low accuracy region means illuminating the low accuracy region while changing a color tone of the illuminance variable lamp 42. The change in the color tone means, for example, illuminating the low accuracy region while changing light of a low wavelength to light of a high wavelength, or illuminating the low accuracy region while changing light of a high wavelength to light of a low wavelength. The color tone may be changed stepwise or continuously. Further, when the laser light source is composed of R, G, and B light sources, only the R light source may be turned on, the R light source may be turned off and the G light source may be turned on, and the G light source may be turned off and the B light source may be turned on.

Sequentially forming the plurality of light distribution patterns in the low accuracy region means forming at least two different light distribution patterns with a time difference. Two different light distribution patterns may be formed continuously. In the time difference between the two different light distribution patterns, there may be time during which light is not emitted.

When the light distribution pattern is changed stepwise, time for maintaining one light distribution pattern is made longer than the exposure time (shutter speed) of the vehicle camera 6. The lamp control unit 43 changes the light distribution pattern such that a light distribution pattern when the vehicle camera 6 captures an image of the $n^{th}$ frame and a light distribution pattern when the vehicle camera 6 captures an image of the $m^{th}$ ($m \ne n$) frame are different from each other. When the light distribution pattern is continuously changed, an amount of change in the light distribution pattern during the exposure time of the vehicle camera 6 is set to 30% or less. This is because it is not preferable that the light distribution pattern changes during the exposure of the vehicle camera 6.

Total time during which the lamp control unit 43 causes the illuminance variable lamp 42 to form a plurality of light distribution patterns is preferably set to 3 seconds or less. The total time is preferably 1 second or less. The number of light distribution patterns formed by the illuminance variable lamp 42 caused by the lamp control unit 43 is preferably two or more, more preferably five or more, still more preferably ten or more.

The lamp control unit 43 may be configured to cause the illuminance variable lamp 42 to repeatedly form a plurality of light distribution patterns of a specific combination over the total time. For example, the lamp control unit 43 may maintain each of a first light distribution pattern of a first illuminance and a second light distribution pattern of a second illuminance different from the first illuminance for 0.2 seconds, and repeat the first light distribution pattern and the second light distribution pattern for 1 second.

In the illuminance variable lamp 42 which is the laser scanning device of the present embodiment, the laser light source emits the laser light. Further, an emitting range is scanned with the laser light by moving the movable mirror. "Sequentially forming the plurality of light distribution patterns in the low accuracy region" means, in the present embodiment, changing the amount of energization supplied to the laser light source when the movable mirror is moved to the position of the low accuracy region irradiated with the laser light, or changing the amount of energization by switching the energization supplied to the R light source, the G light source, and the B light source.

It should be noted that it is preferable to switch the plurality of light distribution patterns at a speed that can be recognized by the camera but cannot be recognized by human eyes. Further, it is preferable that the light distribution pattern having illuminance greater than the illuminance of the low accuracy region when the position information of the low accuracy region is acquired is maintained for 0.01 seconds in the low accuracy region, and thereafter the light distribution pattern having illuminance less than the illuminance of the low accuracy region when the position information of the low accuracy region is acquired is maintained for 0.01 seconds. More preferably, a series of light distribution patterns to be changed in this way are repeated for a predetermined period of time (for example, 1 second).

The plurality of light distribution patterns to be sequentially formed may be a plurality of predetermined light distribution patterns. The plurality of light distribution patterns to be sequentially formed may be recorded in a recording unit connected to the lamp control unit 43. A plurality of pattern sets each including the plurality of patterns may be recorded in the recording unit. Alternatively, a function in which the illuminance is determined according to time or a function in which chromaticity is determined according to time may be recorded in the recording unit.

The lamp control unit 43 may read a specific pattern set or function from the recording unit according to the external environment, and cause the illuminance variable lamp 42 to form a plurality of light distribution patterns based on the read pattern set or the function.

The "external environment" refers to illuminance surrounding the vehicle, a spectrum of light surrounding the vehicle, time, humidity, weather, and the like. For example, the lamp control unit 43 may read a specific pattern set from the recording unit according to the output of the illuminance sensor capable of acquiring the illuminance surrounding the vehicle.

In this way, the vehicle lamp system 100B of the present embodiment includes:

a first lamp (the illuminance variable lamp 42) capable of performing adjustment such that illuminance or color of any region of an angle of view of the vehicle camera 6 mounted on a vehicle 1 is different from illuminance or color of another region, and the lamp control unit 43 controlling the first lamp so as to sequentially form the plurality of light distribution patterns different in at least one of the illuminance and the color in the low accuracy region, after acquiring, from the vehicle control unit 3 which controls the vehicle 1, the position information of the low accuracy region where the recognition accuracy of the angle of view of the vehicle camera 6 is equal to or less than the predetermined value.

According to the vehicle lamp system 100B of the present embodiment, the illuminance or the color differs between a first light distribution pattern and a second light distribution pattern. Therefore, one of the image captured by the vehicle camera 6 when the first light distribution pattern is irradiated and the image captured by the vehicle camera 6 when the second light distribution pattern is irradiated is more easily recognized than the other.

For example, in a case where the low accuracy region is too dark to identify the object and illuminance of the second light distribution pattern is set to be larger than illuminance of the first light distribution pattern, the image captured by the vehicle camera 6 when the second light distribution pattern is irradiated is more easily recognized than the image captured by the vehicle camera 6 when the first light distribution pattern is irradiated.

Alternatively, when the first light distribution pattern is irradiated with blue light, the second light distribution is irradiated with green light, and the object is easily recognized by green light, the object is easily identified by the image captured by the vehicle camera 6 when the second light distribution pattern is irradiated.

In this way, according to the vehicle lamp system 100B of the present embodiment, the recognition accuracy of the vehicle camera 6 can be increased.

Further, when the lamp control unit 43 causes the variable illuminance lamp 42 to sequentially form the plurality of light distribution patterns in the low accuracy region, the illuminance variable lamp 42 may be configured to acquire a luminous intensity and a wavelength of light illuminating the low accuracy region, and sequentially form the plurality of light distribution patterns with a light intensity or a wavelength different from this luminous intensity and this wavelength. Accordingly, when it is difficult to identify the object in a state in which the illuminance variable lamp 42 is already turned on, it is easy to form a light distribution pattern in which the object is easily identified.

Fourth Embodiment

Figure 10:
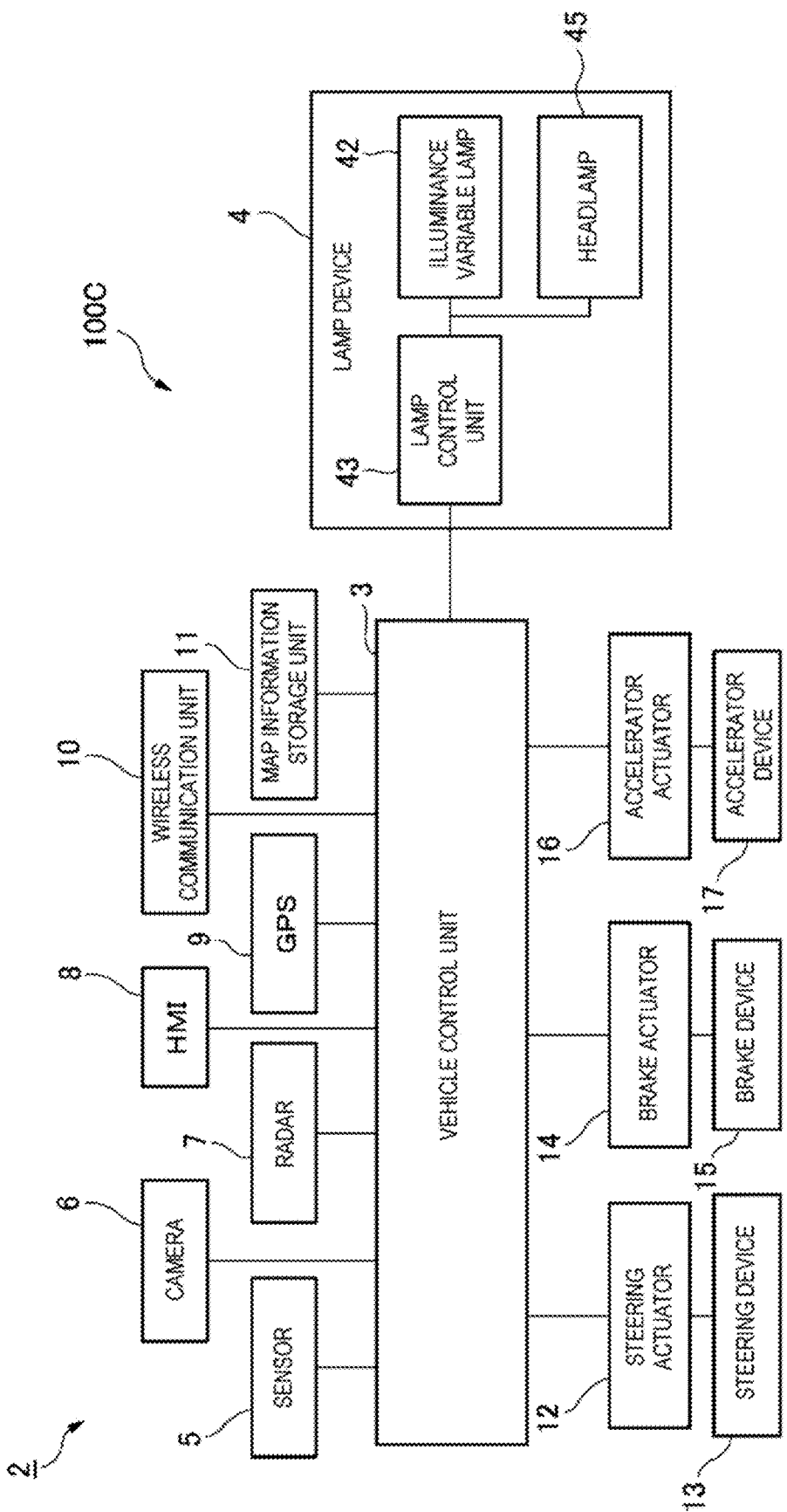
FIG. 10 is a block diagram of a vehicle system including a vehicle lamp system according to a fourth embodiment of the present invention.

FIG. 10 is a block diagram of the vehicle system 2 including a vehicle lamp system 100C according to a fourth embodiment of the present invention. As illustrated in FIG. 10, the vehicle lamp system 100C may include the headlamp 45. A known headlamp can be used as the headlamp 45. The headlamp 45 is electrically connected to the lamp control unit 43. The lamp control unit 43 controls the headlamp 45 to form the high beam light distribution pattern, form the low beam light distribution pattern, or turn itself off.

When the lamp control unit 43 acquires the position information of the low accuracy region from the vehicle control unit 3, the lamp control unit 43 may be configured to determine whether the headlamp 45 is in the lighting state. When the headlamp 45 is in the lighting state, the lamp control unit 43 may be configured to cause the illuminance variable lamp 42 to sequentially form a plurality of light distribution patterns in the low accuracy region in an illuminance or a color different from the illuminance or the color of the low accuracy region irradiated by the headlight 45. According to such a configuration, the recognition accuracy can be improved when it is difficult to identify the object even when the headlamp 45 is turned on.

Fifth Embodiment

Vehicle lamp systems 100D to 100G according to a fifth embodiment to an eighth embodiment of the present invention will be described using FIGS. 11 to 14.

Since the vehicle 1 on which each of the vehicle lamp systems 100D to 100G according to the fifth embodiment to the eighth embodiment is mounted is similar to the vehicle 1 on which the vehicle lamp system 100B according to the third embodiment described with reference to FIGS. 7A, 7B, and 8 is mounted, a description thereof will be omitted. Common members are denoted by the same reference numerals.

Further, the lamp control unit 43 according to the fifth embodiment to the eighth embodiment acquires the position information of the low angle region from the vehicle control unit 3 as described with reference to FIG. 3. The vehicle lamp systems 100D to 100G according to the fifth embodiment to the eighth embodiment are different from the first embodiment to the fourth embodiment in the flow to be executed after acquiring the position information of the low angle region. The embodiments will be described in detail below.

Figure 11:
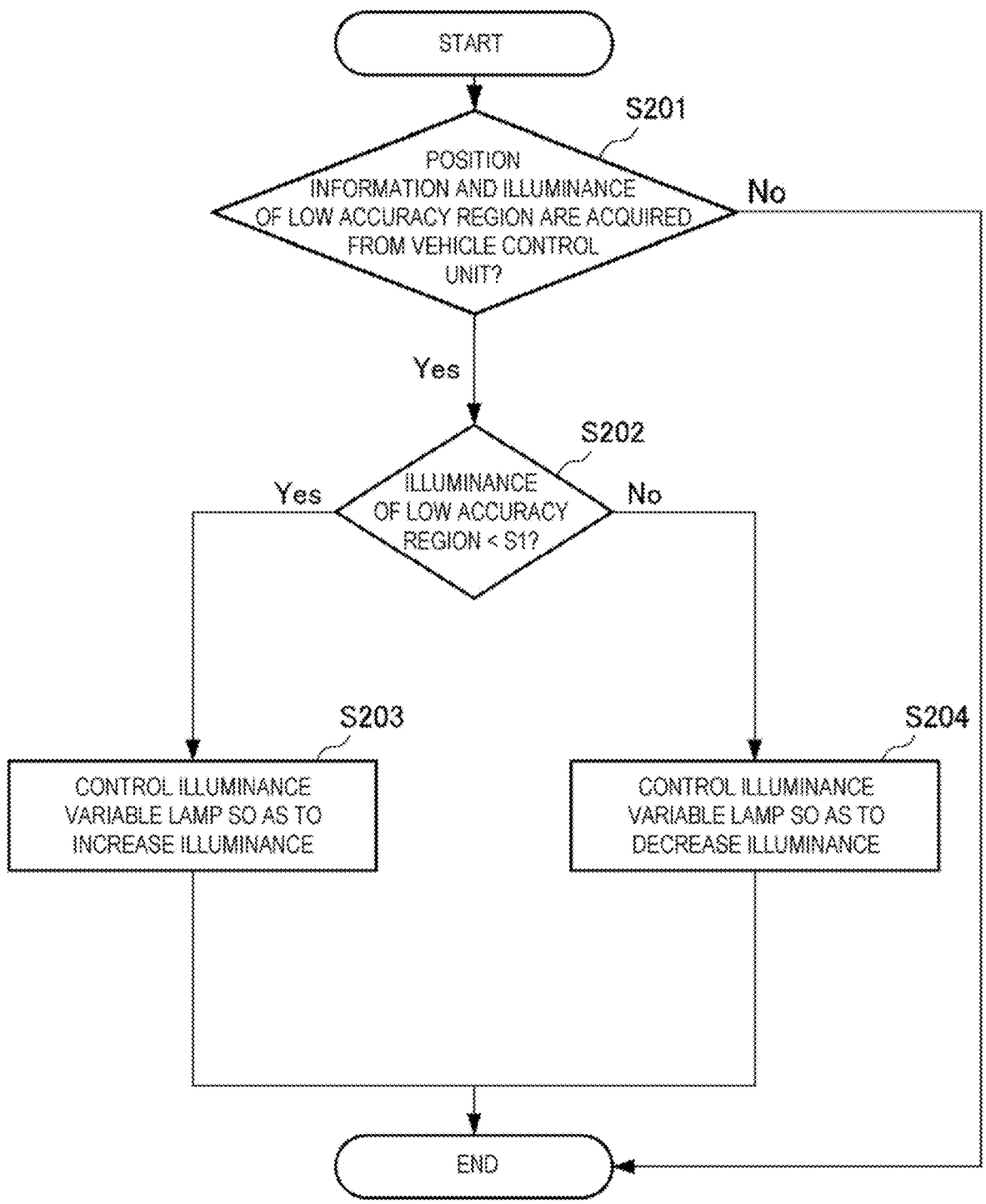
FIG. 11 is a flowchart executed by a vehicle lamp system according to a fifth embodiment of the present invention.

Processing executed by the vehicle lamp system 100D according to the fifth embodiment of the present invention will be described using FIG. 11. FIG. 11 is a flowchart of processing executed by the vehicle lamp system 100D according to the fifth embodiment of the present invention.

As illustrated in FIG. 11, first, after the lamp control unit 43 acquires the position information and illuminance of the low accuracy region from the vehicle control unit 3, the lamp control unit 43 executes the following processing (step S201: Yes). When the position information of the low accuracy region is not acquired from the vehicle control unit 3, the lamp control unit 43 does not execute the following processing (step S201: No). The illuminance of the region can be obtained, for example, as an average value, a maximum value, or a minimum value of luminance of the pixels belonging to the low accuracy region among the pixels of the vehicle camera 6.

Next, the lamp control unit 43 determines whether the acquired illuminance of the low accuracy region is less than the threshold S1 (step 202). When the lamp control unit 43 determines that the illuminance of the low accuracy region is less than the threshold S1 (step S202: Yes), the lamp control unit 43 controls the illuminance variable lamp 42 to increase the illuminance of the low accuracy region (step S203). When the illuminance of the low accuracy region is less than the threshold S1, it means that the low accuracy region is dark. That is, the recognition accuracy is low since the low accuracy region is dark. Therefore, when step S203 is executed, the illuminance variable lamp 42 illuminates the low accuracy region at illuminance higher than the illuminance of the low accuracy region when the vehicle control unit 3 determines that the recognition accuracy is low, so that the recognition accuracy is increased.

On the other hand, when the lamp control unit 43 determines that the illuminance of the low accuracy region is equal to or greater than the threshold S1 (step S202: No), the lamp control unit 43 controls the illuminance variable lamp 42 to decrease the illuminance of the low accuracy region (step S204). When the illuminance of the low accuracy region is equal to or greater than the threshold S1, it means that the low accuracy region is bright. That is, the recognition accuracy is low since the low accuracy region is too bright. Therefore, when step S204 is executed, the illuminance variable lamp 42 illuminates the low accuracy region at illuminance lower than the illuminance of the low accuracy region when the vehicle control unit 3 determines that the recognition accuracy is low, so that the recognition accuracy is increased.

In the illuminance variable lamp 42 which is the laser scanning device of the present embodiment, the laser light source emits the laser light. Further, the emitting range is scanned with the laser light by moving the movable mirror. In the present embodiment, the expression "the illuminance variable lamp 42 is controlled so as to increase the illuminance of the low accuracy region" means that the lamp control unit 43 increases the amount of energization supplied to the laser light source when the movable mirror is moved to a position of the low accuracy region irradiated with the laser light. On the other hand, the expression "the illuminance variable lamp 42 is controlled so as to decrease the illuminance of the low accuracy region" means that the lamp control unit 43 decreases the amount of energization supplied to the laser light source when the movable mirror is moved to the position of the low accuracy region irradiated with the laser light.

Steps S201 to S204 described above are repeatedly executed at predetermined intervals. The predetermined interval is 1 second or less, preferably 0.1 second or less.

Further, the processing of steps S202 to S204 may be repeated while the lamp control unit 43 acquires the position information of the low accuracy region from the vehicle control unit 3.

Alternatively, when the lamp control unit 43 acquires the position information and the illuminance of the low accuracy region from the vehicle control unit 3, the illuminance of the low accuracy region is adjusted by the illuminance variable lamp 42 such that the recognition accuracy is increased according to the illuminance of the low accuracy region. This adjustment may be continued for a predetermined number of times or a predetermined period of time. According to this aspect, when the position information and the illuminance of the low accuracy region are acquired at a certain time, the recognition accuracy can be continuously increased by repeating Step S203 or S204 a predetermined number of times regardless of whether the information about the low accuracy region is acquired from the vehicle control unit 3.

The low accuracy region is a region which moves with time. Therefore, it is preferable that the lamp control unit 43 continuously acquires the position information of the low accuracy region and controls the illuminance variable lamp 42 so as to emit the light toward the moving low accuracy region. For example, it is preferable that the position information of the low accuracy region is acquired from the vehicle control unit 3 immediately before the execution of steps S203 and S204, and the illuminance variable lamp 42 is controlled based on the position information. However, when steps S201 to S204 are processed at a sufficiently high speed, the control of the illuminance variable lamp 42 in steps S203 and S204 may be performed based on the position information of the low accuracy region acquired in step S201.

Sixth Embodiment

In the fifth embodiment described above, the configuration for acquiring the illuminance of the low accuracy region from the vehicle control unit 3 has been described. However, the present invention does not have to acquire the illuminance of the low accuracy region from the vehicle control unit 3. A sixth embodiment of the present invention relates to a vehicle lamp system 100E capable of increasing the recognition accuracy even when the illuminance of the low accuracy region is not acquired from the vehicle control unit 3.

Figure 12:
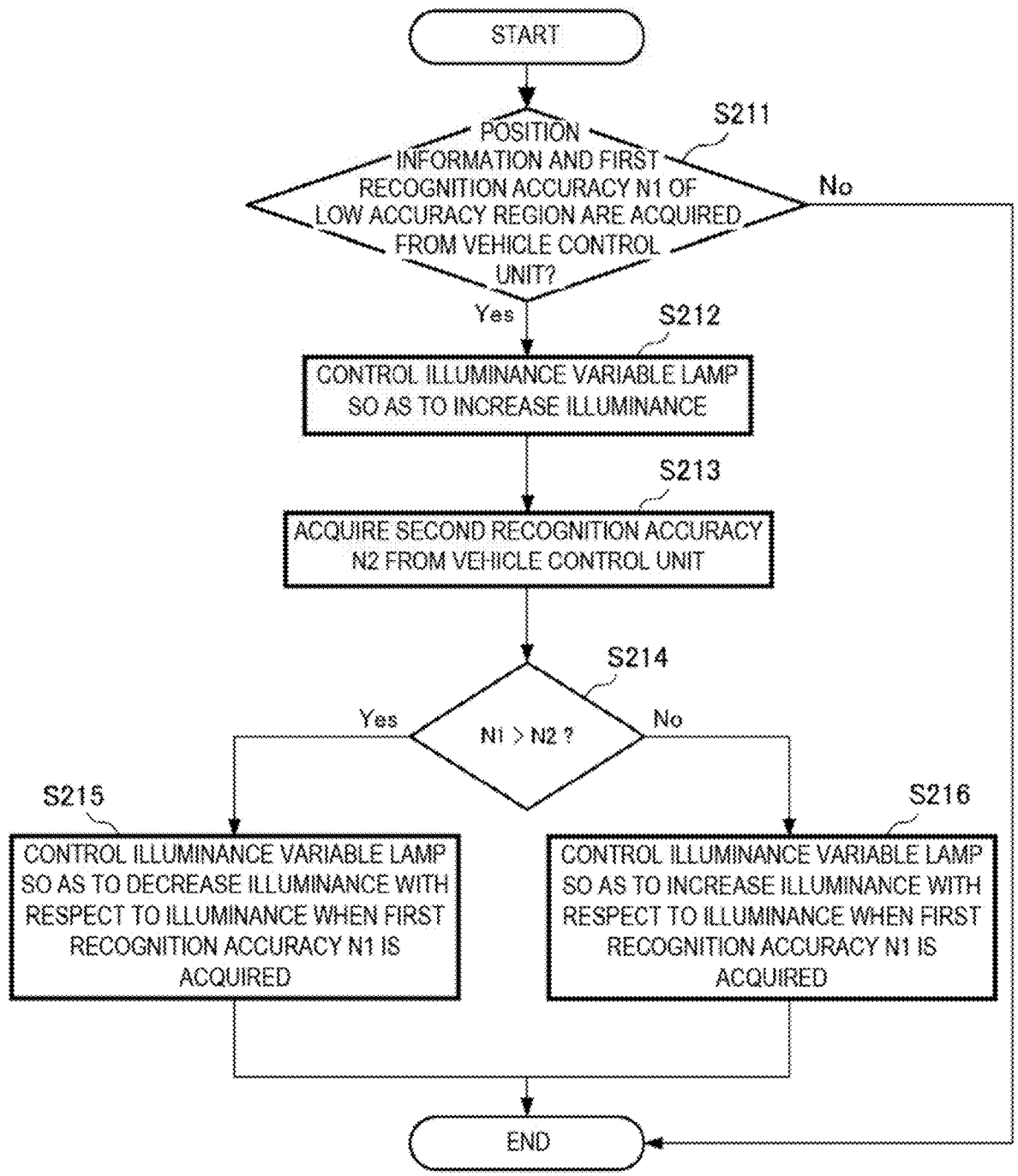
FIG. 12 is a flowchart executed by a vehicle lamp system according to a sixth embodiment of the present invention.

Processing executed by the vehicle lamp system 100E according to the sixth embodiment of the present invention will be described using FIG. 12. FIG. 12 is a flowchart executed by the vehicle lamp system 100E according to the sixth embodiment of the present invention. Since a configuration of the vehicle lamp system 100E according to the sixth embodiment is similar to a configuration of the vehicle lamp system 100D according to the fifth embodiment, a description thereof will be omitted.

As illustrated in FIG. 12, the lamp control unit 43 acquires the position information and the recognition accuracy of the low accuracy region from the vehicle control unit 3 (step S211). In the following description, the recognition accuracy acquired in step S211 will be referred to as first recognition accuracy N1.

Next, the lamp control unit 43 controls the illuminance variable lamp 42 to increase the illuminance of the low accuracy region (step S212). Next, the lamp control unit 43 acquires, as second recognition accuracy N2, recognition accuracy of the low accuracy region illuminated by an increased illuminance from the vehicle control unit 3 (step S213).

Next, the lamp control unit 43 compares the first recognition accuracy N1 with the second recognition accuracy N2 (step S214). That is, the lamp control unit 43 compares the recognition accuracy when the vehicle control unit 3 determines that the region is the low accuracy region with the recognition accuracy when the low accuracy region is illuminated in a brighter state. When the first recognition accuracy N1 is higher than the second recognition accuracy N2, it means that the darker region has higher recognition accuracy. On the other hand, when the first recognition accuracy N1 is lower than the second recognition accuracy N2, it means that the brighter region has higher recognition accuracy.

Therefore, when it is determined that the first recognition accuracy N1 is higher than the second recognition accuracy N2 (step S214: Yes), the lamp control unit 43 controls the illuminance variable lamp 42 to decrease the illuminance of the low accuracy region with respect to the illuminance when the first recognition accuracy N1 is acquired (step S215). That is, when the region is too bright and the recognition accuracy is low, the recognition accuracy of the low accuracy region is increased by darkening the low accuracy region.

When it is determined that the first recognition accuracy N1 is lower than the second recognition accuracy N2 (step S214: No), the lamp control unit 43 controls the illuminance variable lamp 42 so as to increase the illuminance of the low accuracy region with respect to the illuminance when the first recognition accuracy N1 is acquired (step S216). That is, when the region is too dark and the recognition accuracy is low, the recognition accuracy of the low accuracy region is increased by brightening the low accuracy region.

In this way, according to the vehicle lamp system 100E of the present embodiment, the recognition accuracy can be increased even when the illuminance of the low accuracy region is not acquired from the vehicle control unit 3.

Steps S211 to S216 described above are repeatedly executed at predetermined intervals. The predetermined interval is 1 second or less, preferably 0.1 second or less.

Further, the processing of steps S212 to S216 may be repeated while the lamp control unit 43 acquires the position information of the low accuracy region from the vehicle control unit 3.

Alternatively, when the lamp control unit 43 acquires the position information and the recognition accuracy of the low accuracy region from the vehicle control unit 3, the illuminance variable lamp 42 may be configured to continuously adjust the illuminance of the low accuracy region a predetermined number of times or for a predetermined period of time such that the recognition accuracy is increased. According to this aspect, when the position information and the recognition accuracy of the low accuracy region are acquired at a certain time, the recognition accuracy can be continuously increased by repeating Step S215 or S216 a predetermined number of times regardless of whether the information about the low accuracy region is acquired from the vehicle control unit 3.

In the embodiment described above, an example in which the lamp control unit 43 controls the illuminance variable lamp 42 so as to increase the illuminance of the low accuracy region has been described in step S212, but the lamp control unit 43 may control the illuminance variable lamp 42 so as to decrease the illuminance of the low accuracy region in step S212.

When the illuminance variable lamp 42 is controlled so as to decrease the illuminance of the low accuracy region in step S212, the determination criterion in step S214 is reversed. When the first recognition accuracy N1 is higher than the second recognition accuracy N2, it means that the brighter region has higher recognition accuracy. On the other hand, when the first recognition accuracy N1 is lower than the second recognition accuracy N2, it means that the darker region has higher recognition accuracy.

When it is determined that the first recognition accuracy N1 is higher than the second recognition accuracy N2 in step S214, the lamp control unit 43 controls the illuminance variable lamp so as to increase the illuminance of the low accuracy region with respect to the illuminance when the first recognition accuracy is acquired.

Further, when it is determined that the first recognition accuracy N1 is lower than the second recognition accuracy N2 in step S214, the lamp control unit 43 controls the illuminance variable lamp so as to decrease the illuminance of the low accuracy region with respect to the illuminance when the first recognition accuracy is acquired.

The low accuracy region is a region which moves with time. Therefore, it is preferable that the lamp control unit 43 continuously acquires the position information of the low accuracy region and controls the illuminance variable lamp 42 so as to emit the light toward the moving low accuracy region. For example, it is preferable that the position information of the low accuracy region is acquired from the vehicle control unit 3 immediately before the execution of steps S215 and S216, and the illuminance variable lamp 42 is controlled based on the position information. However, when steps S211 to S216 are processed at a sufficiently high speed, the control of the illuminance variable lamp 42 in steps S215 and S216 may be performed based on the position information of the low accuracy region acquired in step S211.

Seventh Embodiment

In the fifth and sixth embodiments described above, an example in which the vehicle lamp systems 100D, 100E each include only the illuminance variable lamp 42 is described, but the vehicle lamp system can also be configured in combination with the headlamp 45 (the illuminance fixing lamp) capable of emitting light with a specific illuminance toward an area including the angle of view of the vehicle camera 6.

A vehicle lamp system 100F includes the headlamp 45 in addition to the configuration of the vehicle lamp systems 100D, 100E of the fifth and sixth embodiments described above. The lamp control unit 43 is electrically connected to the headlamp 45. The lamp control unit 43 can control the headlamp 45. A known headlamp can be used as the headlamp 45. The headlamp 45 can form a high beam light distribution pattern and a low beam light distribution pattern. Further, the lamp control unit 43 controls the headlamp 45 to form the high beam light distribution pattern, form the low beam light distribution pattern, or turn itself off.

Figure 13:
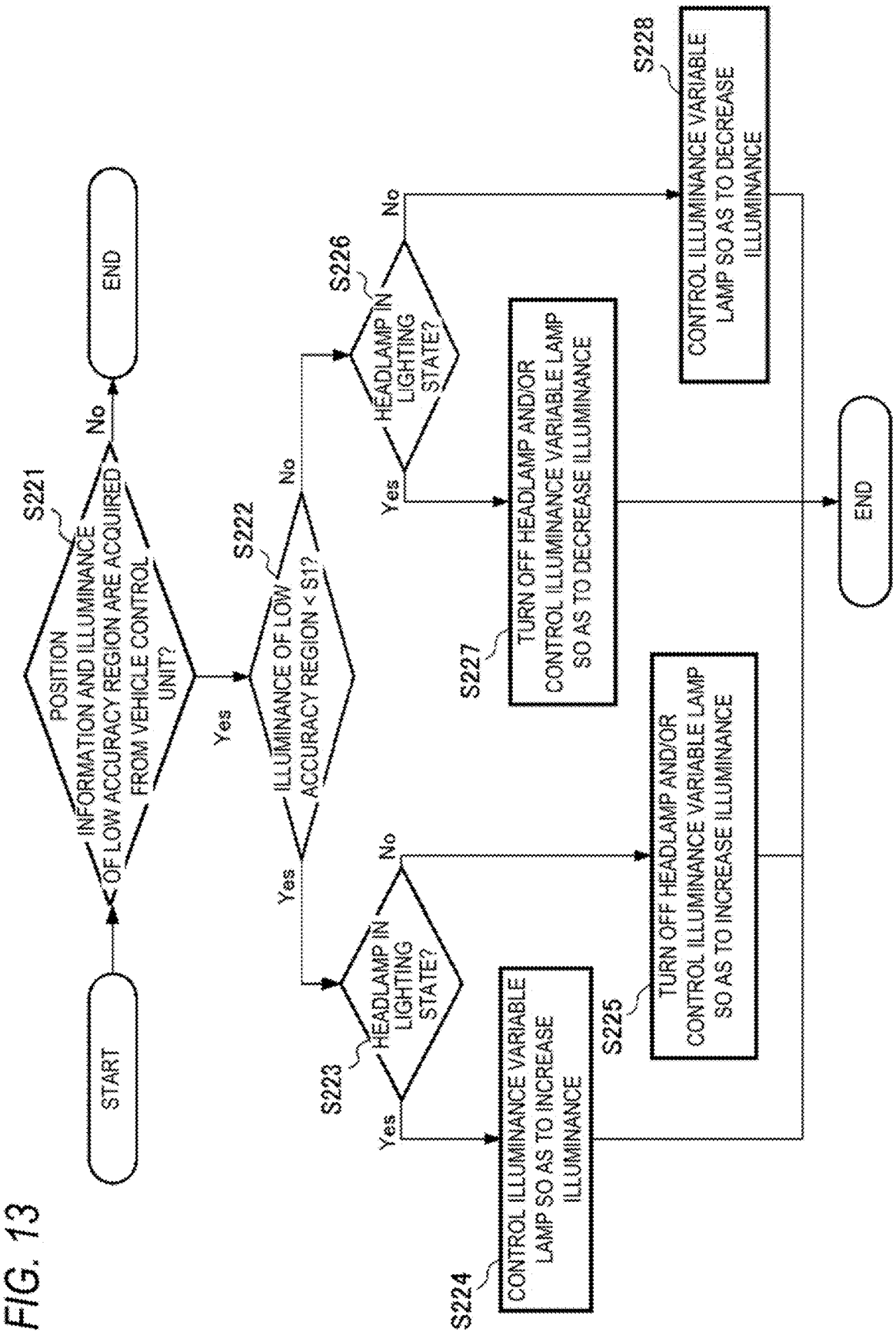
FIG. 13 is a flowchart executed by a vehicle lamp system according to a seventh embodiment of the present invention.

FIG. 13 is a flowchart executed by the vehicle lamp system 100F according to a seventh embodiment of the present invention. As illustrated in FIG. 13, since steps S221, S222 executed by the lamp control unit 43 are the same as steps S201, S202 of the fifth embodiment described above, a description thereof will be omitted. After it is determined whether the illuminance of the low accuracy region is less than the threshold S1 (step S222), the lamp control unit 43 determines whether the headlamp 45 is in the lighting state (steps S223, S226).

When the illuminance of the low accuracy region is less than the threshold S1 (step S222: Yes) and the headlamp 45 is in the lighting state (step S223: Yes), the lamp control unit 43 controls the illuminance variable lamp 42 to increase the illuminance of the low accuracy region (step S224). When the illuminance of the low accuracy region is less than the threshold S1, the low accuracy region is too dark and it may be difficult for the vehicle control unit 3 to identify the object. When step S224 is executed, the illuminance variable lamp 42 illuminates the low accuracy region at illuminance higher than the illuminance of the low accuracy region when the vehicle control unit 3 determines that the recognition accuracy is low, so that the recognition accuracy is increased.

When the illuminance of the low accuracy region is less than the threshold S1 (step S222: Yes) and the headlamp 45 is in the OFF state (step S223: No), the lamp control unit 43 turns on the headlamp 45 and/or controls the illuminance variable lamp 42 so as to increase the illuminance of the low accuracy region (step S225).

When the headlamp 45 is too dark in the OFF state and the recognition accuracy is low, the low accuracy region can be brightly illuminated by turning on the headlamp 45, so that the recognition accuracy can be increased. Alternatively, by increasing the amount of energization supplied to the light source of the illuminance variable lamp 42 without turning on the headlamp 45, the low accuracy region can be brightly illuminated, so that the recognition accuracy can also be increased. Alternatively, by turning on the headlamp 45 and increasing the amount of energization supplied to the light source of the illuminance variable lamp 42, the low accuracy region can be brightly illuminated, so that the recognition accuracy can also be increased.

The lamp control unit 43 may be configured to always execute one of turning on only the headlamp 45 and increasing the amount of energization supplied to the light source of the illuminance variable lamp 42.

Alternatively, the lamp control unit 43 may be configured to select and execute one of turning on only the headlamp 45 and increasing the amount of energization supplied to the light source of the illuminance variable lamp 42 according to other external information. The other external information includes, for example, an average illuminance around the vehicle, time, weather, a traveling speed of the own vehicle, and exposure time of the vehicle camera 6. For example, in a situation where the surroundings are dark, when the headlamp 45 is turned on, recognition accuracy of a region other than the low accuracy region can be increased. Alternatively, when the traveling speed of the own vehicle is high, the exposure time of the vehicle camera 6 is set to be short. When the exposure time of the vehicle camera 6 is short, luminance of all pixels of the vehicle camera 6 tends to be low in general. Therefore, when the headlamp 45 is turned on, the recognition accuracy of the region other than the low accuracy region can be increased.

When the illuminance of the low accuracy region is equal to or greater than the threshold S1 (step S222: No) and the headlamp 45 is in the lighting state (step S226: Yes), the lamp control unit 43 turns off the headlamp 45 and/or controls the illuminance variable lamp 42 so as to decrease the illuminance of the low accuracy region (step S227). When the illuminance of the low accuracy region is equal to or greater than the threshold S1, the low accuracy region is too bright and it may be difficult for the vehicle control unit 3 to identify the object. When step S227 is executed, since the low accuracy region is illuminated at the illuminance lower than the illuminance of the low accuracy region when the vehicle control unit 3 determines that the recognition accuracy is low, the recognition accuracy is increased.

When the headlamp 45 is too bright in the lighting state and the recognition accuracy is low, the low accuracy region can be darkened by turning off the headlamp 45, so that the recognition accuracy can be increased. Alternatively, by decreasing the amount of energization supplied to the light source of the illuminance variable lamp 42 without turning off the headlamp 45, the low accuracy region can be darkened, so that the recognition accuracy can also be increased. Alternatively, by turning off the headlamp 45 and decreasing the amount of energization supplied to the light source of the illuminance variable lamp 42, the low accuracy region can be darkened, so that the recognition accuracy can also be increased.

The lamp control unit 43 may be configured to always execute one of only turning off the headlamp 45 and decreasing the amount of energization supplied to the light source of the illuminance variable lamp 42.

Alternatively, the lamp control unit 43 may be configured to select and execute one of only turning off the headlamp 45 and decreasing the amount of energization supplied to the light source of the illuminance variable lamp 42 according to the other external information.

When the illuminance of the low accuracy region is equal to or greater than the threshold S1 (step S222: No) and the headlamp 45 is in the OFF state (step S226: No), the lamp control unit 43 controls the illuminance variable lamp 42 so as to decrease the illuminance of the low accuracy region (step S228).

Steps S221 to S228 described above are repeatedly executed at predetermined intervals. The predetermined interval is 1 second or less, preferably 0.1 second or less.

Further, the processing of steps S221 to S228 may be repeated while the lamp control unit 43 acquires the position information of the low accuracy region from the vehicle control unit 3.

Alternatively, when the lamp control unit 43 acquires the position information and the illuminance of the low accuracy region from the vehicle control unit 3, the lamp control unit 43 controls illuminance of the low accuracy region by the illuminance variable lamp 42 and/or the headlamp 45 such that the recognition accuracy is increased. This control may be continued for a predetermined number of times or a predetermined period of time. According to this aspect, when the position information of the low accuracy region is acquired at a certain time, the recognition accuracy can be continuously increased by repeating Steps S224, S225, S227 and S228 a predetermined number of times regardless of whether the information about the low accuracy region is acquired from the vehicle control unit 3.

The low accuracy region is a region which moves with time. Therefore, it is preferable that the lamp control unit 43 continuously acquires the position information of the low accuracy region and controls the illuminance variable lamp 42 so as to emit the light toward the moving low accuracy region. For example, it is preferable that the position information of the low accuracy region is acquired from the vehicle control unit 3 immediately before the execution of steps S224, S225, S227 and S228, and the illuminance variable lamp 42 is controlled based on the position information. However, when steps S221 to S228 are processed at a sufficiently high speed, the control of the illuminance variable lamp 42 in steps S224, S225, S227 and S228 may be performed based on the position information of the low accuracy region acquired in step S221.

Eighth Embodiment

In the seventh embodiment described above, the configuration for acquiring the illuminance of the low accuracy region from the vehicle control unit 3 has been described. However, the present invention does not have to acquire the illuminance of the low accuracy region from the vehicle control unit 3. An eighth embodiment of the present invention relates to a vehicle lamp system 100G capable of increasing the recognition accuracy even when the illuminance of the low accuracy region is not acquired from the vehicle control unit 3.

Processing executed by the vehicle lamp system 100G according to the eighth embodiment of the present invention will be described using FIG. 14. FIG. 14 is a flowchart executed by the vehicle lamp system 100G according to the eighth embodiment of the present invention. Since a configuration of the vehicle lamp system 100G according to the eighth embodiment is similar to a configuration of the vehicle lamp system 100F according to the seventh embodiment, a description thereof will be omitted.

As illustrated in FIG. 14, the lamp control unit 43 acquires the position information and the recognition accuracy of the low accuracy region from the vehicle control unit 3 (step S231). In the following description, the recognition accuracy acquired in step S231 will be referred to as the first recognition accuracy N1.

Next, the lamp control unit 43 controls the illuminance variable lamp 42 so to turn on the headlamp 45 or increase the illuminance of the low accuracy region (step S232). Next, the lamp control unit 43 acquires, as the second recognition accuracy N2, the recognition accuracy of the low accuracy region illuminated by the increased illuminance from the vehicle control unit 3 (step S233).

Next, the lamp control unit 43 compares the first recognition accuracy N1 with the second recognition accuracy N2 (step S234). That is, the lamp control unit 43 compares the recognition accuracy when the vehicle control unit 3 determines that the region is the low accuracy region with the recognition accuracy when the low accuracy region is illuminated in a brighter state. Further, the lamp control unit 43 determines whether the headlamp 45 at the time of step S231 is in the lighting state (steps S235, S238).

When the first recognition accuracy N1 is higher than the second recognition accuracy N2 (step S234: Yes) and the headlamp 45 is in the lighting state (step S235: Yes), the lamp control unit 43 controls the illuminance variable lamp 42 so as to decrease the illuminance of the low accuracy region with respect to the illuminance when the first recognition accuracy N1 is acquired (step S236). That is, when the region is too bright and the recognition accuracy is low, the recognition accuracy of the low accuracy region is increased by darkening the low accuracy region.

When the first recognition accuracy N1 is higher than the second recognition accuracy N2 (step S234: Yes) and the headlamp 45 is in the OFF state (step S235: No), the lamp control unit 43 turns off the headlamp 45 and/or controls the illuminance variable lamp 42 so as to decrease the illuminance of the low accuracy region with respect to the illuminance when the first recognition accuracy N1 is acquired (step S237). That is, when the region is too bright and the recognition accuracy is low, the recognition accuracy of the low accuracy region is increased by darkening the low accuracy region.

When the second recognition accuracy N2 is higher than the first recognition accuracy N1 (step S234: No) and the headlamp 45 is in the lighting state (step S238: Yes), the lamp control unit 43 controls the illuminance variable lamp 42 so as to increase the illuminance of the low accuracy region with respect to the illuminance when the first recognition accuracy N1 is acquired (step S239). That is, when the region is too dark and the recognition accuracy is low, the recognition accuracy of the low accuracy region is increased by brightening the low accuracy region.

When the second recognition accuracy N2 is higher than the first recognition accuracy N1 (step S234: No) and the headlamp 45 is in the OFF state (step S238: No), the lamp control unit 43 turns on the headlamp 45 and/or controls the illuminance variable lamp 42 so as to increase the illuminance of the low accuracy region with respect to the illuminance when the first recognition accuracy N1 is acquired (step S240). That is, when the region is too dark and the recognition accuracy is low, the recognition accuracy of the low accuracy region is increased by brightening the low accuracy region.

In this way, according to the vehicle lamp system 100G of the present embodiment, the recognition accuracy can be increased even when the illuminance of the low accuracy region is not acquired from the vehicle control unit 3.

Steps S231 to S240 described above are repeatedly executed at predetermined intervals. The predetermined interval is 1 second or less, preferably 0.1 second or less.

Further, the processing of steps S231 to S240 may be repeated while the lamp control unit 43 acquires the position information of the low accuracy region from the vehicle control unit 3.

Alternatively, when the lamp control unit 43 acquires the position information and the recognition accuracy of the low accuracy region from the vehicle control unit 3, the illuminance variable lamp 42 may be configured to continuously adjust the illuminance of the low accuracy region a predetermined number of times or for a predetermined period of time such that the recognition accuracy is increased. According to this aspect, when the position information and the recognition accuracy of the low accuracy region are acquired at a certain time, the recognition accuracy can be continuously increased by repeating one of steps S236, S237, S239 and S240 a predetermined number of times regardless of whether the information about the low accuracy region is acquired from the vehicle control unit 3.

In the embodiment described above, an example in which the lamp control unit 43 turns on the headlamp 45 or controls the illuminance variable lamp 42 so as to increase the illuminance of the low accuracy region has been described in step S232, but the lamp control unit 43 may turn off the headlamp 45 or control the illuminance variable lamp 42 so as to decrease the illuminance of the low accuracy region in step S232.

When the illuminance variable lamp 42 is controlled so as to decrease the illuminance of the low accuracy region in step S232, the determination criterion in step S234 is reversed. When the first recognition accuracy N1 is higher than the second recognition accuracy N2, it means that the brighter region has higher recognition accuracy. On the other hand, when the first recognition accuracy N1 is lower than the second recognition accuracy N2, it means that the darker region has higher recognition accuracy.

Therefore, when it is determined that the first recognition accuracy N1 is higher than the second recognition accuracy N2 and the headlamp 45 is in the lighting state, the lamp control unit 43 controls the illuminance variable lamp 42 so as to increase the illuminance of the low accuracy region with respect to the illuminance when the first recognition accuracy N1 is acquired (step S239).

When it is determined that the first recognition accuracy N1 is higher than the second recognition accuracy N2 and the headlamp 45 is in the OFF state, the lamp control unit 43 turns on the headlamp 45 and/or controls the illuminance variable lamp 42 so as to increase the illuminance of the low accuracy region with respect to the illuminance when the first recognition accuracy N1 is acquired (step S240).

When it is determined that the first recognition accuracy N1 is lower than the second recognition accuracy N2 and the headlamp 45 is in the lighting state, the lamp control unit 43 turns on the headlamp 45 and/or controls the illuminance variable lamp 42 so as to decrease the illuminance of the low accuracy region with respect to the illuminance when the first recognition accuracy N1 is acquired (step S236).

Therefore, when it is determined that the first recognition accuracy N1 is lower than the second recognition accuracy N2 and the headlamp 45 is in the OFF state, the lamp control unit 43 controls the illuminance variable lamp 42 so as to decrease the illuminance of the low accuracy region with respect to the illuminance when the first recognition accuracy N1 is acquired (step S237).

The low accuracy region is a region which moves with time. Therefore, it is preferable that the lamp control unit 43 continuously acquires the position information of the low accuracy region and controls the illuminance variable lamp 42 so as to emit the light toward the moving low accuracy region. For example, it is preferable that the position information of the low accuracy region is acquired from the vehicle control unit 3 immediately before the execution of steps S236, S237, S239 and S240, and the illuminance variable lamp 42 is controlled based on the position information. However, when steps S231 to S240 are processed at a sufficiently high speed, the control of the illuminance variable lamp 42 in steps S236, S237, S239 and S240 may be performed based on the position information of the low accuracy region acquired in step S231.

Although the embodiment of the present invention has been described above, it is needless to say that the technical scope of the present invention should not be limitedly interpreted by the description of the present embodiments. It is to be understood by those skilled in the art that the present embodiment is merely examples and various modifications may be made within the scope of the invention described in the claims. The technical scope of the present invention should be determined based on the scope of the invention described in the claims and an equivalent scope thereof.

As illustrated in FIG. 3, when there are the plurality of low accuracy regions A1, A2, the lamp control unit 43 performs the processing described above for each low accuracy region. As illustrated in FIG. 3, even in a case where the region A1 which is too bright and has a low recognition accuracy and the region A2 which is too dark and has a low recognition accuracy coexist, the recognition accuracy of each region can be increased according to the embodiment described above.

In the embodiment described above, an example in which the vehicle camera 6 is a camera that acquires information in front of the vehicle has been described. However, the vehicle camera according to the present invention is not limited to a vehicle camera that acquires information in front of the vehicle. For example, the vehicle camera may be a rear camera which acquires information behind the vehicle, or a side camera which acquires information on the left side or the right side of the vehicle. In a case where the vehicle camera is a rear camera, the illuminance fixing lamp described above (the headlamp) is a lamp which emits light of a certain intensity to the rear of the vehicle. In a case where the vehicle camera is a side camera, the illuminance fixing lamp described above (the headlamp) is a lamp which emits light of a certain intensity to the left side or the right side of the vehicle.

Further, the vehicle camera is not limited to a camera that can receive visible light. The vehicle camera may be an infrared camera. In a case where the vehicle camera is the infrared camera, the illuminance variable lamp can be implemented by a lamp capable of emitting infrared rays.

Further, in the embodiment described above, a case where the illuminance variable lamp 42 is the laser scanning device has been described, but the type of the illuminance variable lamp is not particularly limited. For example, the illuminance variable lamp may be a lamp including a plurality of LED light sources. In this case, the region to which the illuminance variable lamp emits light is virtually divided into a plurality of regions, and the plurality of LED light sources can emit light to the respective regions. Each region to which the LED light source is capable of emitting light is associated with a region where the low accuracy region of the vehicle camera is recognized. In the vehicle lamp system configured as described above, the control described above can be executed by controlling the amount of energization supplied to the LED light source which emits light to the low accuracy region and a designated region.

In the present embodiment, the driving mode of the vehicle is described as including the fully automatic driving mode, the advanced driving support mode, the driving support mode and the manual driving mode, but the driving mode of the vehicle should not be limited to these four modes. A classification of the driving mode of the vehicle may be appropriately changed according to laws or regulations related to automatic driving in each country. Similarly, definitions of the "fully automatic driving mode", the "advanced driving support mode" and the "driving support mode" in the description of the present embodiment are merely examples and may be appropriately changed according to the laws or regulations related to the automatic driving in each country.

This application is based on a Japanese Patent Application (Patent Application No. 2018-212376) filed on Nov. 12, 2018, a Japanese Patent Application (Patent Application No. 2018-212377) filed on Nov. 12, 2018, and a Japanese Patent Application (Patent Application No. 2018-212378) filed on Nov. 12, 2018, the contents of which are incorporated herein by reference.

INDUSTRIAL APPLICABILITY

According to the present invention, a vehicle lamp system capable of improving recognition accuracy of a camera is provided.

REFERENCE SIGNS LIST

1 vehicle
2 vehicle system
3 vehicle control unit
4 lamp device
6 vehicle camera
42 illuminance variable lamp
43 lamp control unit
44 lamp-mounted camera
45 headlamp (illuminance fixing lamp)
100 to 100G vehicle lamp system
A1, A2 low accuracy region

The invention claimed is:

1. A vehicle lamp system comprising:
  an illuminance variable lamp capable of emitting light toward an entire angle of view of a vehicle camera mounted on a vehicle and capable of performing adjustment such that illuminance of any region is different from illuminance of another region;
  a lamp-mounted camera including, in an angle of view, a range larger than and encompassing the entire angle of view of the vehicle camera; and a lamp controller configured to control the illuminance variable lamp,
wherein the lamp controller is configured to
after acquiring, from a vehicle controller configured to control the vehicle, position information of a low accuracy region where a recognition accuracy of the angle of view of the vehicle camera is equal to or less than a predetermined value,
acquire illuminance of the low accuracy region with reference to information acquired by the lamp-mounted camera, and
control the illuminance variable lamp so as to increase the illuminance of the low accuracy region if the illuminance of the low accuracy region is less than a threshold, and/or control the illuminance variable lamp so as to decrease the illuminance of the low accuracy region if the illuminance of the low accuracy region is equal to or greater than the threshold.

2. A vehicle lamp system comprising:
an illuminance variable lamp capable of emitting light toward an entire angle of view of a vehicle camera mounted on a vehicle and capable of performing adjustment such that illuminance of any region is different from illuminance of another region;
a lamp-mounted camera including, in an angle of view, a range larger than and encompassing the entire angle of view of the vehicle camera;
an illuminance fixing lamp capable of emitting light with a specific illuminance toward a region including the angle of view of the vehicle camera; and
a lamp controller configured to control the illuminance variable lamp and the illuminance fixing lamp,
wherein the lamp controller is configured to
after acquiring, from a vehicle controller configured to control the vehicle, position information and illuminance of a low accuracy region where a recognition accuracy of the angle of view of the vehicle camera is equal to or less than a predetermined value,
determine whether the illuminance of the low accuracy region is less than a threshold,
turn on the illuminance fixing lamp and/or control the illuminance variable lamp so as to increase the illuminance of the low accuracy region if the illuminance of the low accuracy region is less than the threshold, and/or
turn off the illuminance fixing lamp and/or control the illuminance variable lamp so as to decrease the illuminance of the low accuracy region if the illuminance of the low accuracy region is equal to or greater than the threshold.

3. The vehicle lamp system according to claim 1,
wherein the lamp controller is configured to repeat the control while the vehicle controller acquires the position information of the low accuracy region from the vehicle controller.

4. The vehicle lamp system according to claim 1,
wherein the low accuracy region is a region which moves with time, and
wherein the lamp controller is configured to continuously acquire the position information of the low accuracy region and control the illuminance variable lamp so as to emit light toward the moving low accuracy region.

5. A vehicle lamp system comprising:
a first lamp capable of performing adjustment such that illuminance or color of any region of an angle of view of a vehicle camera mounted on a vehicle is different from illuminance or color of another region; and
a lamp controller configured to control the first lamp so as to form a predetermined combination of a plurality of light distribution patterns that are different in at least one of illuminance and color in a low accuracy region, after acquiring, from a vehicle controller configured to control the vehicle, position information of the low accuracy region where a recognition accuracy of the angle of view of the vehicle camera is equal to or less than a predetermined value, wherein
each light distribution pattern of the plurality of light distribution patterns is a pattern formed by an entirety of light emitted by the first lamp at a given time, and
the predetermined combination is a combination of the plurality of light distribution patterns formed sequentially with each light distribution pattern being displayed for a predetermined amount of time, and
wherein the lamp controller is further configured to control the first lamp to repeatedly form the predetermined combination of the plurality of light distribution patterns for a predetermined total amount of time.

6. The vehicle lamp system according to claim 5,
wherein after acquiring the position information of the low accuracy region from the vehicle controller in a lighting state of the first lamp, the lamp controller is configured to control the first lamp to form, in the low accuracy region, the predetermined combination of the plurality of light distribution patterns different in at least one of the illuminance and the color with illuminance or color different from the illuminance or the color of the low accuracy region illuminated by the first lamp.

7. The vehicle lamp system according to claim 5 further comprising:
a second lamp configured to emit light with specific illuminance and specific color toward a region including the angle of view of the vehicle camera,
wherein after acquiring the position information of the low accuracy region from the vehicle controller in a lighting state of the second lamp, the lamp controller is configured to control the first lamp to form, in the low accuracy region, the predetermined combination of a plurality of light distribution patterns different in at least one of the illuminance and the color with illuminance or color different from the illuminance or the color of the low accuracy region illuminated by the second lamp.

8. The vehicle lamp system according to claim 5,
wherein the predetermined total amount of time is 3 seconds or less.

9. The vehicle lamp system according to claim 5,
wherein the plurality of predetermined light distribution patterns in the predetermined combination are formed continuously.

10. The vehicle lamp system according to claim 5,
wherein the plurality of predetermined light distribution patterns in the predetermined combination are formed stepwise.

* * * * *